United States Patent
Bastiyali

(10) Patent No.: US 12,013,546 B2
(45) Date of Patent: *Jun. 18, 2024

(54) VEHICLE MOUNTABLE HOLOGRAPHIC PROMOTING SYSTEM

(71) Applicant: Tarkan Bastiyali, New York, NY (US)

(72) Inventor: Tarkan Bastiyali, New York, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 16/935,796

(22) Filed: Jul. 22, 2020

(65) Prior Publication Data
US 2020/0387932 A1    Dec. 10, 2020

Related U.S. Application Data

(63) Continuation-in-part of application No. 16/731,891, filed on Dec. 31, 2019, now Pat. No. 11,709,371, which is a continuation-in-part of application No. 16/435,267, filed on Jun. 7, 2019, now Pat. No. 10,755,612.

(51) Int. Cl.
| | |
|---|---|
| *G02B 27/02* | (2006.01) |
| *G03H 1/00* | (2006.01) |
| *G09F 9/33* | (2006.01) |
| *G09F 19/12* | (2006.01) |
| *G09F 19/18* | (2006.01) |
| *G09F 21/00* | (2006.01) |
| *G06Q 30/0251* | (2023.01) |

(52) U.S. Cl.
CPC .......... *G02B 27/02* (2013.01); *G03H 1/0005* (2013.01); *G09F 9/33* (2013.01); *G09F 19/12* (2013.01); *G09F 19/18* (2013.01); *G09F 21/00* (2013.01); *G03H 2001/0055* (2013.01); *G06Q 30/0265* (2013.01)

(58) Field of Classification Search
None
See application file for complete search history.

(56) References Cited

U.S. PATENT DOCUMENTS

| | | |
|---|---|---|
| 5,724,161 A | 3/1998 | Smith |
| 2002/0005826 A1 | 1/2002 | Pederson |
| 2005/0083403 A1 | 4/2005 | Flores et al. |
| 2011/0067279 A1 | 3/2011 | Dos Santos Camacho |
| 2017/0308930 A1 | 10/2017 | Shore |
| 2018/0176097 A1* | 6/2018 | Russell .................... G06F 8/64 |
| 2021/0224018 A1 | 7/2021 | Li et al. |

FOREIGN PATENT DOCUMENTS

| | | |
|---|---|---|
| CN | 208045012 U | 11/2018 |
| CN | 208268090 U | 12/2018 |
| CN | 111243452 A | 6/2020 |

* cited by examiner

*Primary Examiner* — Stephone B Allen
*Assistant Examiner* — Tamara Y. Washington
(74) *Attorney, Agent, or Firm* — Lerner David LLP

(57) ABSTRACT

Vehicle mountable holographic promoting system and method of use; system includes a body with light, mount, and controller in communication with a software application and the body. The body is mountable to the vehicle using mount. Mount can be removably attachable or otherwise secured to the roof of the vehicle. The controller controls the body such that the body can visually promote via an image display an item using the light-display region appearing to float on a plane above vehicle.

20 Claims, 23 Drawing Sheets

VEHICLE MOUNTABLE HOLOGRAPHIC PROMOTING SYSTEM

CROSS-REFERENCE TO RELATED APPLICATIONS

This application is a Continuation-in-Part of U.S. application Ser. No. 16/731,891, filed on Dec. 31, 2019, pending, which is a Continuation-in-Part of U.S. application Ser. No. 16/435,267, filed on Jun. 7, 2019, pending, and fully incorporates the content of those applications by this reference.

BACKGROUND OF THE INVENTION

The following includes information that may be useful in understanding the present disclosure. It is not an admission that any of the information provided herein is prior art nor material to the presently described or claimed inventions, nor that any explicitly or implicitly referenced publication or document is prior art.

FIELD OF THE INVENTION

The present invention generally relates to the field of displays and, more specifically, relates to vehicular advertising displays.

DESCRIPTION OF RELATED ART

Advertising media such as newspapers, public radio, television, and billboards has suffered a dramatic decrease in popularity and advertising effectiveness with the advent of the internet and mobile phone technology. Sponsors, therefore, are highly motivated to identify new methods of distributing advertisements to create brand awareness. As newer technologies such as mobile phones evolve into highly sophisticated two-way communication systems, advertisers can leverage such technologies to provide trackable advertising impressions and brand awareness by directly displaying advertisements and testimonials to potential customers.

advertising on motor vehicles started long ago, and consumers have become accustomed to various related advertising methods. For instance, a car owner may provide an advertiser with advertising or logo space on the vehicle. The car owners paint or affix these advertisements or logos on the vehicle's body. Advertisers have used these advertising methods extensively. Due to the fixed amount of surface area available on a motor vehicle's body, advertising space is often minimal, while placing-costs on successful vehicles are very high. In exchange, however, the sponsors who purchase advertising space on vehicles get broad spectator and media coverage throughout the race. Thus, although expensive, such advertising on the motorsport vehicle body by the sponsors provide direct and indirect benefits to the sponsors in increased sales of their products/services and improve goodwill toward the advertiser.

Of course, the owner or operator of the motorsport vehicle would like to charge the highest amount possible for such advertising space on the motor vehicle body to maximize the revenue generated by such advertisements. While a vehicle's surface area may technically limit generated revenue, too much advertising on vehicles causes observers to ignore the advertisements, reducing the advertisement's effectiveness. A suitable solution is desired.

US Pub. No. 2017/0308930 to Michael W. Shore relates to the vehicle advertising system and method. The described vehicle advertising system and method comprises an electronic display located on a vehicle with the electronic display operably connected to a microcontroller. The vehicle brake pedal is operably connected to the microcontroller and the electronic display, wherein when an operator of the vehicle applies the brake pedal, one or more messages are displayed on the electronic display, and when the operator releases the brake pedal, the message (or messages) is no longer displayed using the electronic display. In some example versions, the electronic display may be implemented in the context of particular display devices, such as, for example, an electronic holographic display that uses light diffraction to create a virtual three-dimensional image of an object. Such a holographic display or another form of 3D imaging can be utilized to electronically display images in an electronic display without requiring the aid of any special glasses or external equipment for a viewer (e.g., other drivers and/or passengers in other vehicles) to see the messages including images displayed using the electronic display.

BRIEF SUMMARY OF THE INVENTION

The present disclosure provides a novel vehicle mountable holographic promoting system. The general purpose of the present disclosure, which will be described subsequently in greater detail, is to provide an efficient and effective promotion means.

A vehicle mountable holographic promoting system is disclosed. The vehicle mountable holographic promoting system includes a body with light, a fan projector, mount, and controller. The body is mountable to a vehicle using a mount, such as a removable clip. The mount can be removably attachable or otherwise secured to a vehicle without damaging the vehicle. The controller controls the body such that the body can visually promote using an image display promotable item using light. The promotable item appears to float on a plane above the vehicle as a holographic image. System 100 further comprises solar panel 160, batteries, or other suitable powering means to power system 100. In some versions, operation of a throttle or gas pedal of the vehicle activates the fan projector to begin to rotate and display the promotable item. Alternatively, the controller can rotate the image while the vehicle is stationary. The controller includes a cellular phone comprising a software application able to specifically control scheduling and advertisement content from a pre-filled business list and specifically control on and off conditions. The system may further include a display region located on a dashboard of the vehicle and communicably coupled with the controller.

A method of using the system is also disclosed. The method of using vehicle mountable holographic promoting system may comprise the steps of providing a system including a projector with light, mount, and controller; the system is mountable to a vehicle using a removably attachable mount, the controller controls the projector to cause it to visually promote using an image display a promotable item using the light, the promotable item appearing to float on a plane above vehicle; mounting system to a top of the vehicle using the mount; causing rotation of the fan projector, and using the controller to display an item using light from the fan projector.

For purposes of summarizing the invention, certain aspects, advantages, and novel features of the invention have been described.

BRIEF DESCRIPTION OF THE DRAWINGS

The figures which accompany the portion of this specification illustrate vehicle mountable holographic promoting systems, constructed, and operative as disclosed below.

The various versions of the present invention will hereinafter be described in conjunction with the appended drawings, wherein like designations denote like elements.

DETAILED DESCRIPTION

Figure 1:
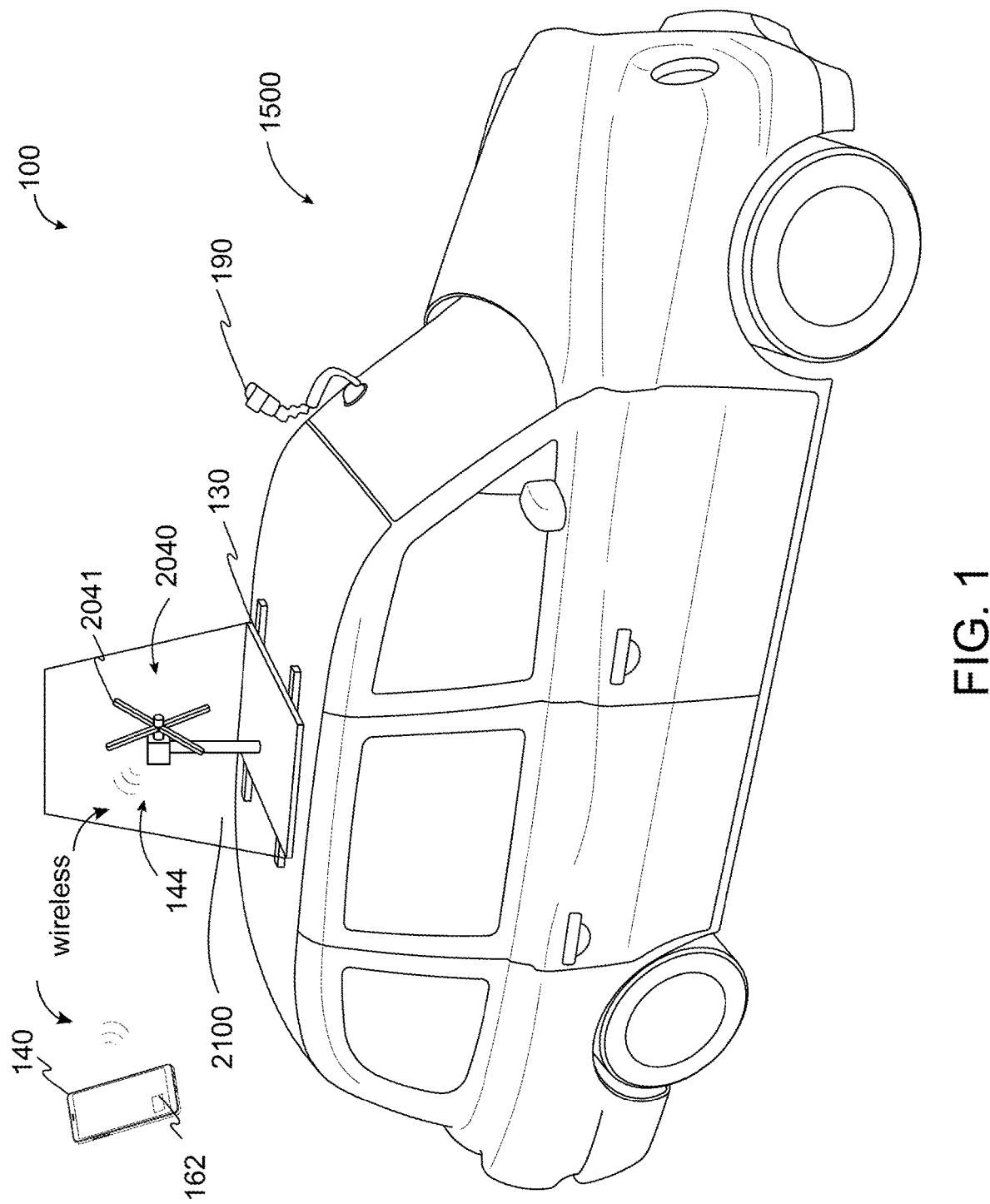
FIG. 1 is a perspective view of the holographic promoting system during an 'in-use' condition.

As discussed above, versions of the present disclosure relate to displays and more particularly to vehicle mountable holographic promoting systems as used to improve the display of advertisements using a movable 3D hologram promoting system roof mountable to a car, train, bus, helicopter, drone, blimp, air taxi, or other moving vehicle or object.

Generally, the present invention provides an advertising method that will increase advertising opportunities for advertisers as well as maximizing the advertising revenues for motor vehicle owners or operators. The system is mountable to a roof, sides, door panels, fenders, front, back, hood, trunk lid, or other surfaces of a vehicle and generates or displays a holographic image for promoting products, events, promotional items, or other images. These projector devices rely on the viewer's persistence of vision. But for conciseness, this image is referred to as a hologram. In this document, "hologram" is used in the lay sense of displaying an image that appears to be three-dimensional and appears to be disconnected from any support. "Hologram" is not used in the specialized way that a laser or optics practitioner would use the word. A body of the system may be mounted to a vehicle using various suitable clips or fasteners for temporarily securing the device to the vehicle without damaging it. In certain versions, pyramid hologram display technology may be used to display the promotional item. Also, the plane of the fan can point in any compass direction around a vehicle, such as front, back, sides, etc., and can angle upward. In some versions, the device automatically moves the fan through those various directions to provide a view to customers positioned around the vehicle. For instance, the projector could automatically rotate around an axis extending vertically through a vehicle.

As an example, a taxicab company may collect payments for ads and videos by email from another company who wishes to advertise on their cabs. Files are received in a format compatible with the 3D projector and a software application. The file then can be emailed to a vehicle operator (cab driver) assigned to the job, and the cab driver can download the material, save it in the software application, and insert each company ad in not only the assigned time-slot, but also on the day, and even month when the ad is scheduled to run. Once all ads are saved in an assigned time-slot, the cab driver will sync the ads with projector or other similar technology using WIFI (or other local area technology) or a chip or card inserted in projector. While on the road, the cab driver will simply activate the projector and ads will automatically display based on the scheduled time for each ad. Alternatively, the driver can download the ads using appropriate controls. In some versions, the driver or ad operator can see the ads listed in the order they are scheduled to run. And this can be controlled using appropriate controls, as well. In some cases, appropriate controls can be a touch screen, mobile phone, or other control mechanisms. Optionally, the driver can be paid for operating the holographic display. The payment can be calculated based on the number of miles the driver accumulated with the projector operating.

Display resolution may be 720P, 1080P, High Definition, 4 k, 5 k, 6 k, 7 k, 8 k, or other suitable resolution. Ads may feature logos, text, hologram movies, or images, which may be rotating and 3D dimensional. Slow, medium, or fast rotational speeds can be selected for the ads.

FIGS. 1-4 shows various views of vehicle mountable holographic promoting system 100. FIG. 1 depicts system 100 with mount 130, controller 140, projector 144, fan 2040, and fan blades 2041. The device is mountable to vehicle 1500 using mount 130, which may include a removable clip or other suitable mounting fastener. In some versions, mount 130 connects to vehicle 1500 using a nondestructive means, a means that does not compromise the skin of vehicle 1500. A G-clamp is suitable for mounting the system to vehicle 1500. In some versions, mount 130 connects to vehicle 1500 using bolts, screws, or other connectors that penetrate vehicle 1500's skin.

Figure 2:
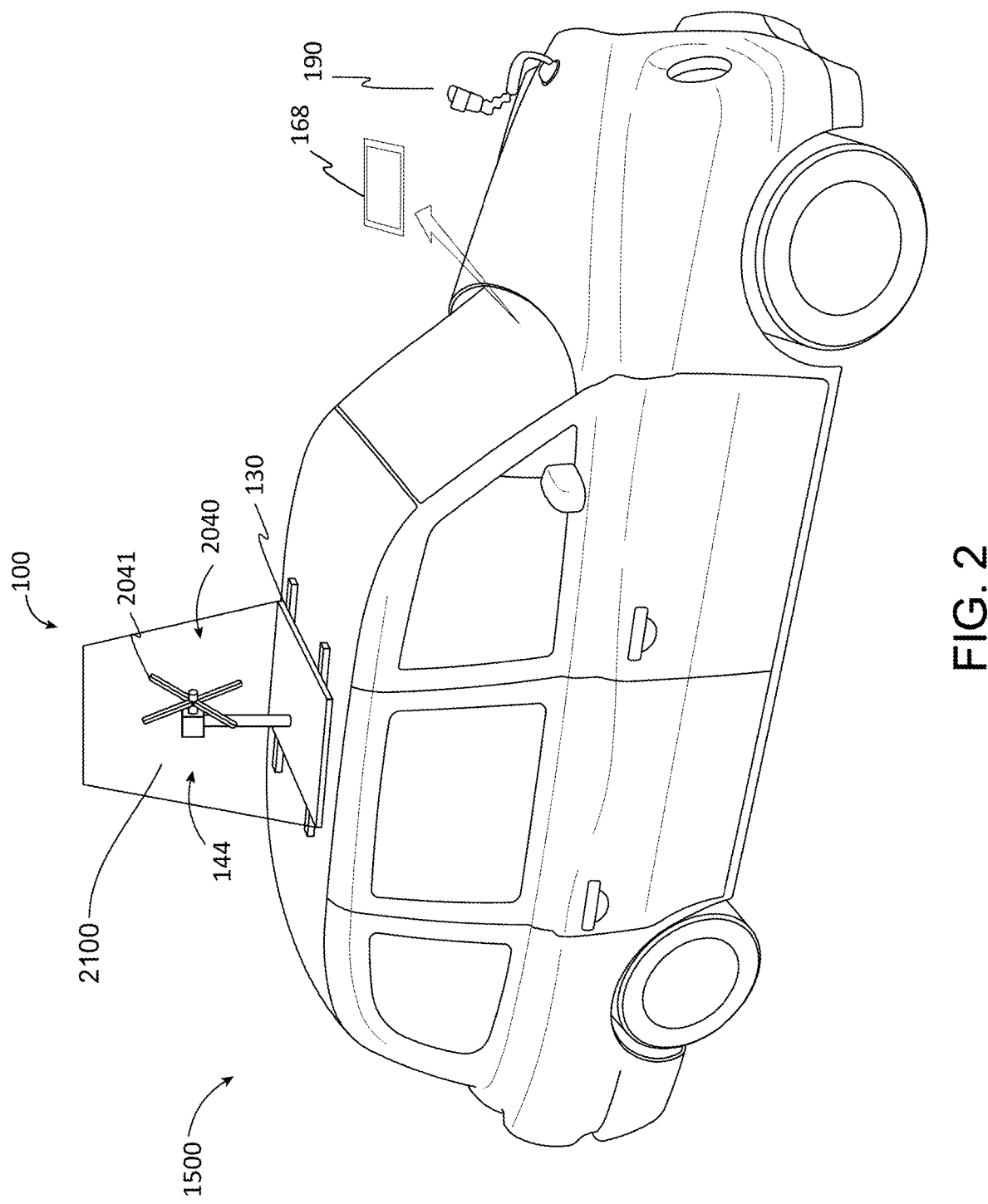
FIG. 2 is a perspective view of the vehicle mountable holographic promoting system of FIG. 1.

Controller 140 controls projector 144 such that projector 144 displays hologram 20 on fan 2040. (see for example FIG. 8) In some versions, projector 144 displays an image by selectively lighting LED placed on fan blades 2041. Sometimes hologram image 20 appears to float above vehicle 1500, like floating in midair. In some versions, vehicle 1500 is automobile 1500, boat 1501, tram car 1510, air taxi 3000, or any other object that moves. Projector 144 can mount on any object that moves. Also, controller 140 can operate the rotation speed and direction of projector 144. In some versions, controller 140 is a cellular phone or other touchscreen electronic device with WIFI capability. In these or other versions, software application 162 operates on an appropriate device to specifically control scheduling and advertisement content from a list and to specifically control on and off conditions. The control scheduling comprises fillable time-slots which may be scheduled with advertisement content. Hologram 20 is displayable and viewable during lighted and non-lighted conditions. Some versions of system 100 include one or more GOPRO or GOPRO-type cameras 190, for example mounted on the windshield of vehicle 1500, as shown in FIG. 1 or mounted on the hood of vehicle 1500, as shown in FIG. 2.

In some versions, holographic projector 144 has 2-8 fan blades 2041 that are arranged into a fan structure; the fan structure has a diameter that ranges from 18-48 inches. For instance, useful fan blade diameters include 22" (56 cm), 30" (75 cm), 24" (60 cm), 35" (89 cm), 27" (67 cm), 26" 65 cm), 16" (40 cm) and 39" (99 cm), among other useful diameters. In some versions, the size of hologram 10 is equal to or ½ to 6 inches smaller than the blade diameter. The diameter of the blades listed above come from measuring the total distance across the region that the blades sweep during operation. For instance, for some 4-blade fans, each blade is 12 inches long ultimately connected a shaft from the motor or a shaft powered by the shaft of the motor these shafts at the head of the device. In some versions, a 24 inch diameter comes about because that is what the two individual blades add up to. But for fans 2040 with hubs 2043 (see FIG. 3) that extend out from a motor shaft some distance, the overall diameter would be 12 inches plus hub 2043 diameter. Some versions of the fan have four 11 inch long blades or four 15 inch long blades yielding overall diameters of 22 inches and 30 inches, respectively. These versions would have fan blades 2041 that extended to the center of the hub 2043. Some versions connect these blades as described above and some versions use different methods to connect these blades. Sometimes, blades 2041 are referred to as rays. Typically, the more blades the better. For instance, having more blades allows for slower rotation, which decreases the sound level from the projector mechanics and diminishes overheating. Some versions use a motor 2044 (see FIG. 3) have modern stators that allow further decreases in sound level. Some projector versions have sound levels as low as 45 dB. Increasing the number of blades while retaining the number of frames per second results in a more luminous and color-saturated (bolder) image.

LEDs and micro-LEDs 2042 line the edges of fan blades 2041. Some versions use a technology that supplies compact, micrometer scale LEDs for creating the holographic image. In some versions, an individual fan blade edge includes 2200 micro-LEDs. When placed on a 24 inch, four-bladed fan, the LEDs provide an image that is 1280 px by 1280 px (sometimes a lower pixel count such as 880 px by 880 px) with a total brightness of approximately 2200 nits (2200 $cd/m^2$). Note that the brightness is measured in candela per square meter is the derived SI unit of Luminance. The unit is based on the candela, the SI unit of luminous intensity, and the square meter the SI unit of area. These brightness levels allow for efficient color display even when projector is in bright conditions. Some versions have a high enough, final resolution to be considered high definition. From this number and arrangement of LEDs, the image may contain millions of colors. In some versions, the device can display more than 16 million colors. Some of the projector devices have the micro-LEDs lights have life spans of about 80,000 hours. Some versions of the 3D LED Fan have a brightness of 800 NITS.

The high resolution of this display enables a wide variety of images to be generated including logos, etc. Images can be uploaded in many different now-existing or later-invented formats. In some versions, the data is in the JPEG or MP4 format. In these or other versions, the data is in JPEG MP4, JPG, GIF, AVI, RVMB, MPEG, RAVB, APEG, PNG, WMV, MKV, MOV, FLV, OBJ, and GLTF formats, among others. In some versions, the data is compatible with 3D Studio, which can be offered as a standalone product or as part of a cloud portal subscription. With the software a user can import and export the video or still data into 3D Studio where it can be manipulated using the software's editing tools. For instance, the data can be animated and then output in mp4, PNG, JPG, obj, obj with attached mtl data) or gltf formats. Once manipulated, the files can be stored in the cloud for ready access or transmission to the device. In some versions the owner of the device manages the contents stored on or served to the device and in other instances, that content management is supplied as a service. Larger numbers of fan blades 2041 allow for slower rotation of the fan and less fan noise. In some versions of the device, the microcontroller or microprocessor do not accept external connections except from the manufacturer. In these or other versions, data is added to the device using solid media such as micro-SD cards. Some versions of the projector can transfer data in or out using and HDMI cable, such as an HDMI cable connected to a smartphone or computer. As those of ordinary skill in the art will recognize, the frame rate of moving pictures is a factor in image quality. In some versions, the holographic projector can project images at greater than 15 frames per second, 20 frames per second, 30 frames per second, and 50 frames per second. Useful resolutions include 440 px by 440 px, 500 px by 500 px, 512 px by 512 px, 720 px by 720 px, 880 px by 880 px, 1024 px by 1024 px, 1080 px by 1080 px, and 1280 px by 1280 px. Examples of useful brightness levels include 204 lumens, 700 lumens, 800 lumens, and 2500 lumens, as well as many others. At these brightness levels, projector 144 will create an image that is visible both day and night. In some versions, the viewing angle is up to 140°. This angle is measured by setting the direct viewing angle (perpendicular to the plain of the fan) to zero. The viewing angle from that zero point extends 70° off to one side and 70° off to the other side yielding a total viewing angle of 140°. In some versions, the viewing angle upward and downward from perpendicular are also up to 140°.

In some versions, special software development kits including APIs or SDKs and development documentation enable the user to develop their own interactive applications using projector 144 as part of the visual display. For instance, the APIs and SDKs support facial recognition, which can allow people interacting with the display to receive interactive messages and personalized images in 3D.

In some versions, fan blades 2041 are plastic, metal, or glass. In some versions, fan blades 2041 are black. Some projection devices use lightweight fans that are easily transportable as well as lightweight fan blades such as fan blades 2041 that are less than 5 kg or less than 2.5 kg. Various versions of the projectors use fans with blades that mass or weigh 20.26 ounces (575 grams), 2.8 kg/6.1 lbs., 2.9 kg/6.3 lbs., or 2.2 kg/5 lbs.

The projector 144 is controlled by a microprocessor or microcontroller. The microcontroller contains hardware and software to communicate over WIFI methodologies or any other suitable now-known or later-invented methodologies. Thus, system 100 has firmware that helps a microprocessor or a microcontroller communicate with other devices storing ad content. In some versions, an important capability of the communication is the device's capability to receive instructions related to the images that are to be displayed. In some versions, the device contains memory coupled to the processor or microcontroller that can store at least a number of hours (in some versions, at least eight hours) of data or image data. Additionally, a remote control unit communicates with the device in some versions. This unit, for instance, a key fob, can remotely power the fan display on and off, among supplying other potential commands. In some versions, remote control unit has a graphical user interface, which is sometimes supplied by a touch screen device. Additionally, some versions respond to speech commands and gesture controls, which could enable control by bystanders, etc., when that type of functionality was desired.

In some versions, two or more holographic display units are ganged together to create larger images 20 than would be possible with a single holographic projector. Larger arrays of these projectors connect in tandem for control by a primary microprocessor or microcontroller to provide much larger images. For instance, a number of projectors 144 could be mounted on the side of a typical panel van and provide holograms 20 on the order of the size of a panel van side.

Hologram 20's size depends on the fan diameter; and in some versions, hologram 20 is about two inches shorter than the fan blade diameter. A glass or plastic cover 2100 or dome can enclose projector 144 to protect projector 144 from the elements, and in some versions, can serve as a projection screen for hologram 20. Additionally, cover 2100 can protect users and the public from contacting moving parts during the projector's operation. In some versions, dome or cover 2100 is 30 inches tall. In some versions cover 2100 reduces fan sounds, or a sound cover is added to reduce, fan sounds generated by projector 144.

In versions having multiple fans, angling fan 2040 can aim hologram 20 upward, in some cases, onto elements in the sky.

Uninterruptible power supplies having 110 or 220 volts connected to vehicle electrical systems, or through other batteries or rechargeable batteries, power projector device. In some versions, the device includes solar cells to make it and its batteries solar powered. UPS battery pack are useful for supplying power to projector 144.

As above, system 100 may include projector 144 (with light 120), mount 130, controller 140, and a 3D projector 144. Sometimes, "3D fan projector 144" is referred to as "fan projector 144", "holographic projector 144", or "projector 144". Projector 144 comprises fan 2040, blade or fan blade 2041. System 100 comprises a glass dome 2100, which is provided to protect projector 144 from weather, water, or other ambient environmental elements. In certain versions, system 100 further comprises solar panel 160 configured to collect solar power during lighted conditions and to provide power to system 100. Various additional sources of power may be used including batteries or a power cord and adaptor for a vehicle cigarette lighter socket or the like (or the device may be wired to existing vehicle wiring system). Solar panel 160 may be square or round shaped and positioned in a center portion flush with a top of the glass dome 2100. Glass dome 2100 may be approximately 12 inches high and 36 inches wide to exceed the width of solar panel 160 and projector 144. In some versions, these projectors 144 are extremely energy efficient with low energy consumption such as consumption rates lower than 60 or 65 W per hour. Some versions of the device have a power consumption up to 40, 55, or 60 watts (per device).

For purposes of this disclosure, "vehicle" includes among other vehicles a train, a bus, a helicopter, a car, a taxi, a ferry, a boat, blimp, air taxi, or a drone. Various versions employ various vehicles including self-powered vehicles as long as vehicle is large enough to support the projection device or as long as vehicle can pull a trailer that can support the projection device. In some versions, projector 144 turns off or blanks hologram 20 when vehicle 1500 stops moving. In these or other versions, projector 144 reads movement data from itself or from vehicle allowing vehicle movement to trigger projector operation without throttle or gas pedal actuation. Alternative versions of system 100 continue to project the image when vehicle 1500 is stationary. In versions where the vehicle is a bus, passengers sitting in the back seat of the bus as well as pedestrians will be able to play holographic roulette. Likewise, passengers and pedestrians can play holographic roulette when the vehicle is a taxi.

FIG. 2 depicts system 100 further including a GOPRO or GOPRO-type camera 190 mounted on the fender or hood of car. Controller 140 interacts with projector 144 through an electronic connection. Controller 140 can be a cellphone or other WIFI-enabled device running software application 162, shown in FIG. 1. In some versions, controller 140 creates a private local area network with projector 144. This connection allows data to be transferred into projector 144 without fear of an unauthorized person gaining access to the data or to projector 144. In some versions, the connection is over a private WIFI network or connection. And sometimes the privacy of the connection is insured using encrypted communications. Alternatively, controller 140 can be a special purpose device and can be powered, as described above. The main type of data to be transmitted to projector 144 is time-slot and ad data to instruct projector 144 which ads to display in which available fillable time-slots. Other data may be transmitted to projector 144, as well. Using near range networking or communicating technology, such as WIFI, allows controller 140 to sync the ad and time-slot data with projector 144. In some versions, the private network is created using Bluetooth technology and is encrypted, as well. In circumstances where using a local network is not desired or when a local network is offline, projector 144 can be equipped with a waterproof slot for receiving a memory card or the like containing ad or time-slot data or both. Some versions of projector 144 could contain functionality to correct directly to the web and could employ virtual private network functionality to create a private or encrypted connection to a version of controller 140 located elsewhere.

Figure 3:
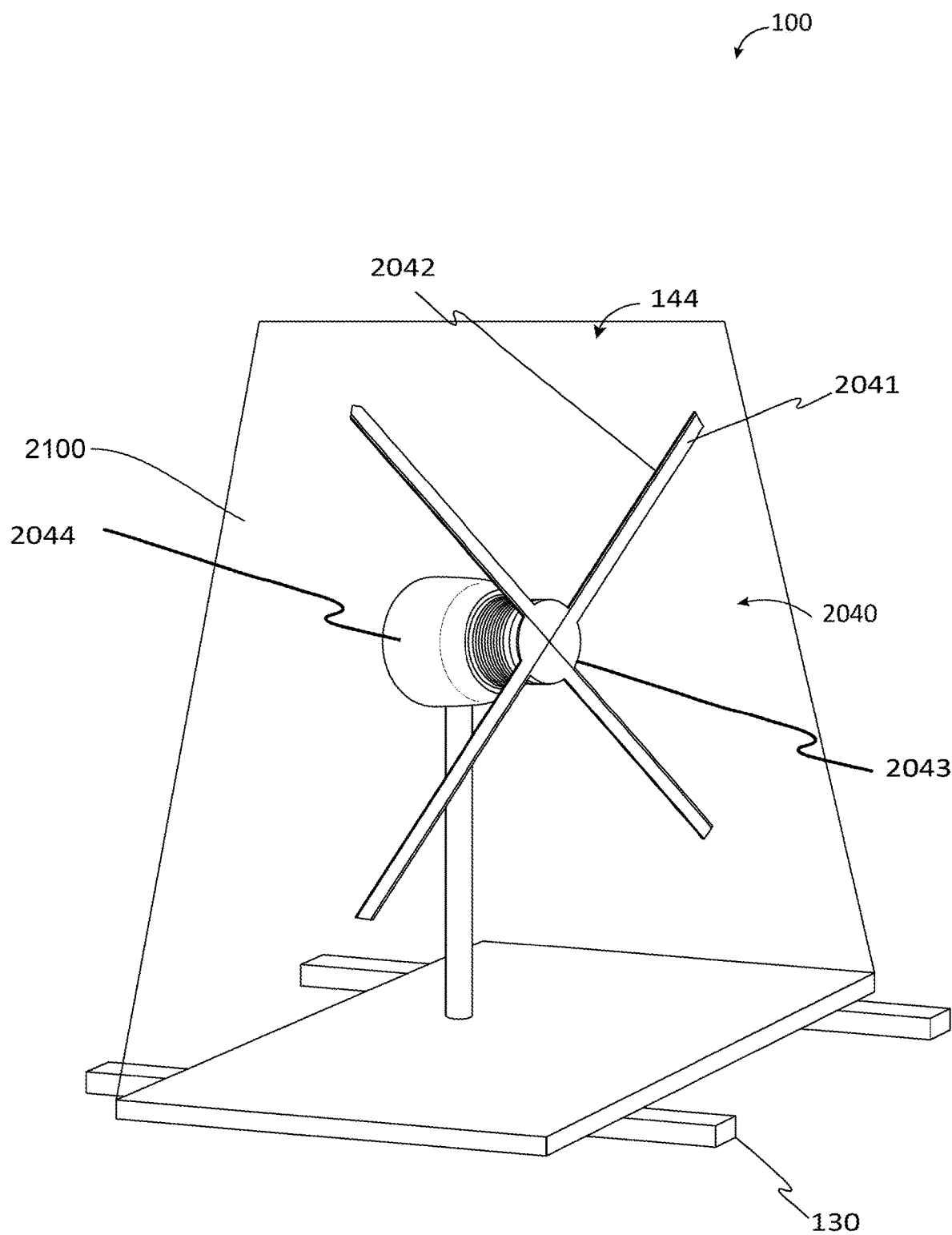
FIG. 3 is a perspective view of a holographic projector.

FIG. 3 shows a perspective view of system 100. As above, system 100 includes mount 130, projector 144, fan 2040, and motor 2044. Fan 2040 comprises fan hub 2043 connected to fan blades 2041, which are lined with LED strips 2042, in some versions. Fan hub 2043 connects fan blades 2041 to motor 2044 to form fan 2040. This version includes cover 2100.

Figure 4:
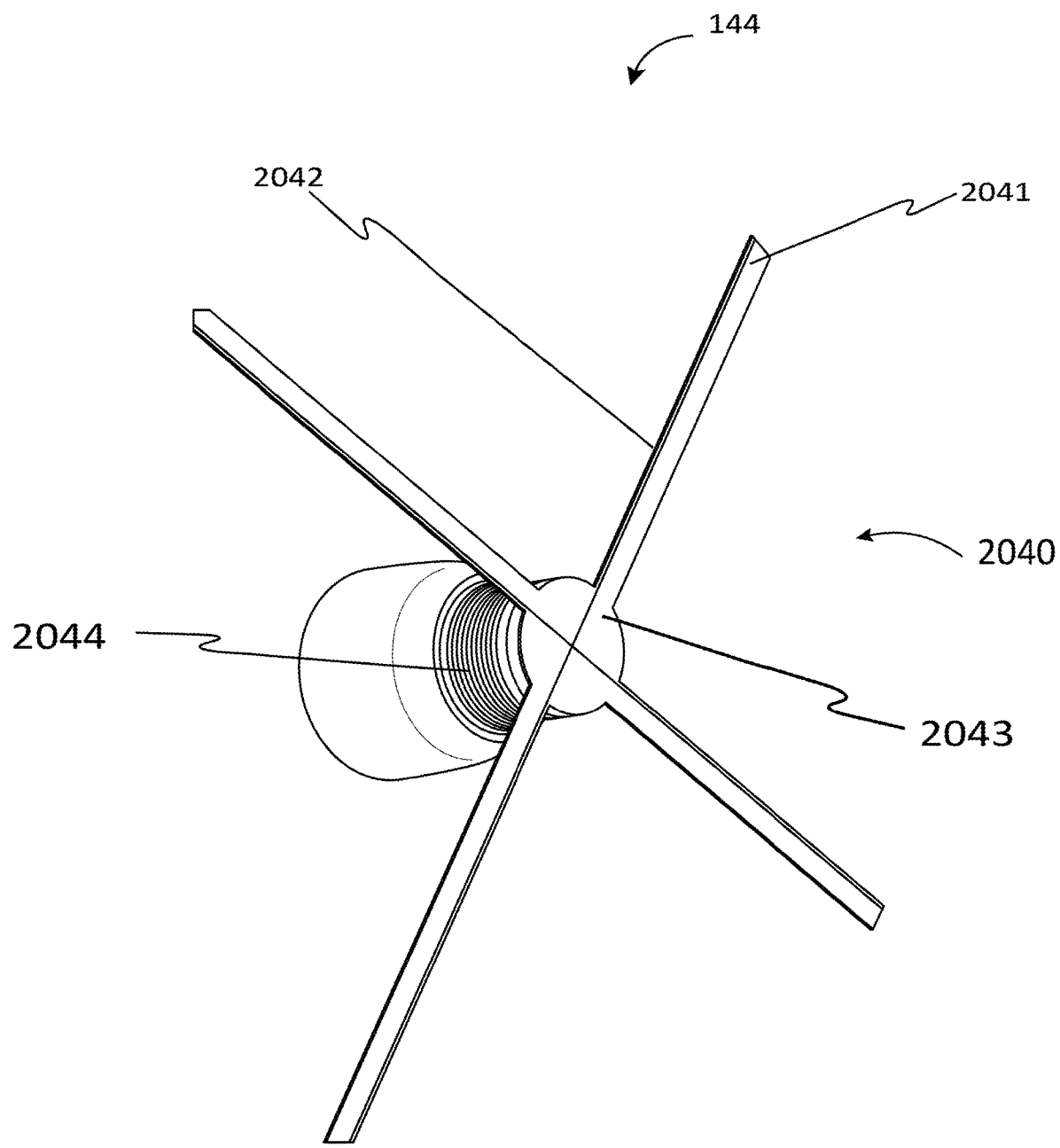
FIG. 4 is a perspective view of the fan of the holographic projector of FIG. 3.

FIG. 4 shows a perspective view of projector 144. As above, projector 144 may include a motor 2044, hub 2043 connecting fan blades 2041 of fan 2040 to motor 2044. Fan blades 2041 have LED strips 2042 along their edges. Projector 144 advertises with a hologram image. Fans 2040 revolve at an appropriate number of revolutions per minute including at least in the range of 670-2000 RPM.

Figure 5:
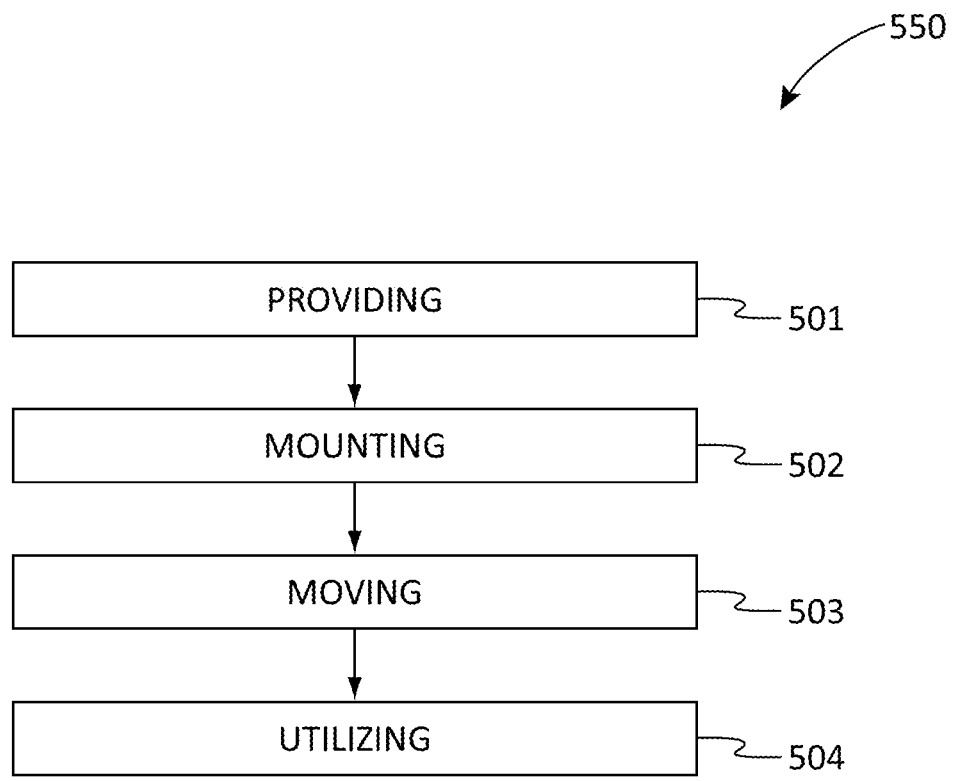
FIG. 5 is a flow diagram illustrating a method of use for the system.

FIG. 5 is a flow diagram 550 illustrating a method of using vehicle mountable promoting system. As illustrated, the method of using vehicle mountable promoting system may include step one 501, providing system 100 including body 110 with light 120, mount 130, and controller 140; body 110 is mountable to vehicle 1500 using mount 130. Mount 130 removably attaches to vehicle 1500; controller 140 operates body 110 such that body 110 visually promotes an item using light 120 reflecting off of fan 2040 creating hologram 20. In some versions, the hologram 20 appears to float on a plane above vehicle 1500; step two 502, mounting or installing system 100 to a top of vehicle 1500 using mount 130; step three 503, vehicle 1500 to initiate rotation of projector 144; and step four 504, using controller 140 to generate an image of item on body 110 using light 120 and projector 144.

Content on projector 144 can be controlled by first downloading and then installing an app from an App Store such as an Android or iOS app onto an appropriate device. Using this app or another app to produce content. And then connecting the phone wires wirelessly (WIFI) or wired (USB, Thunderbolt, HDMI, etc.) to the app running on the microcontroller or microprocessor. Alternatively, a third party could control access to projector 144 and the user could supply content by uploading that content to a secured area on the third party's website. In some versions the device generates a WIFI hotspot that will allow a user to connect their smart phone or similar device, but that prevents any other outside communication between the user's device and the Internet when the user's device is connected to hologram projector 144. The built in WIFI on the devices helps connect with the controller devices, such as cell phones or smart phones. In some versions the ads are downloaded as a playlist over WIFI, or they are otherwise transferred to projector 144. Computer security can be provided using any known method of access control to projector 144. For instance, requiring a serial number of the projector and a password will prevent unauthorized access. In other versions, computer security is created not providing a way for the device to accept an external connection. These types of computer security discourage malware and other attempts to take over the projector or make it display images other than those the owner intends. In some versions, the controller has a wireless antenna sometimes located under a rotor under the fan blades. And the controller uses this wireless antenna to connect to WIFI networks and to connect to local devices, such as a smart phone, when the controller creates the WIFI hotspot or creates a private local WIFI network. The list of communication methodologies includes WIFI; Remote control; Android, iOS, or other operating system; Windows and Macintosh desktop systems; and cloud support. In some versions the software saves content such as mp4 content, directly to your cloud portal account. Once this is done, data transfer to the device can be through cloud connections or the software app. Once a user has uploaded a video to the cloud porta, the video is available to be uploaded either using the cloud (this requires the device being connected to a WIFI network) or using a phone app that downloads a video from the cloud and then uploads to the device using device hotspots. In certain versions, content can be controlled remotely from anywhere in the world. Content produce in .avi, .mov, and .mky can be uploaded to the device. In some versions, uploading the content to the device is using a cloud account or portal. In some versions the user will have to initially build out the content in 3D Models/texture, animate it, and then render it out as an mp4 file.

In some versions, riders in the vehicle can interact with the ad using an appropriate app. For instance, a rider could add special effects or change the rotation to customize the ad's look. For instance, an app could add fireworks or water splashing above the ad. One special effect could cause projection of an image up to 100 feet or greater in the air. Some versions could allow the riders to save the ad along with the special effects into their own social media account (INSTAGRAM or TICTOK) and share their creation with their friends. The advertisers could customize their ad to allow for specific types of special effects and perhaps could run contests to see who created the best ad. The advertisers could give riders a future or current discount for their customization of the ads.

Figure 6:
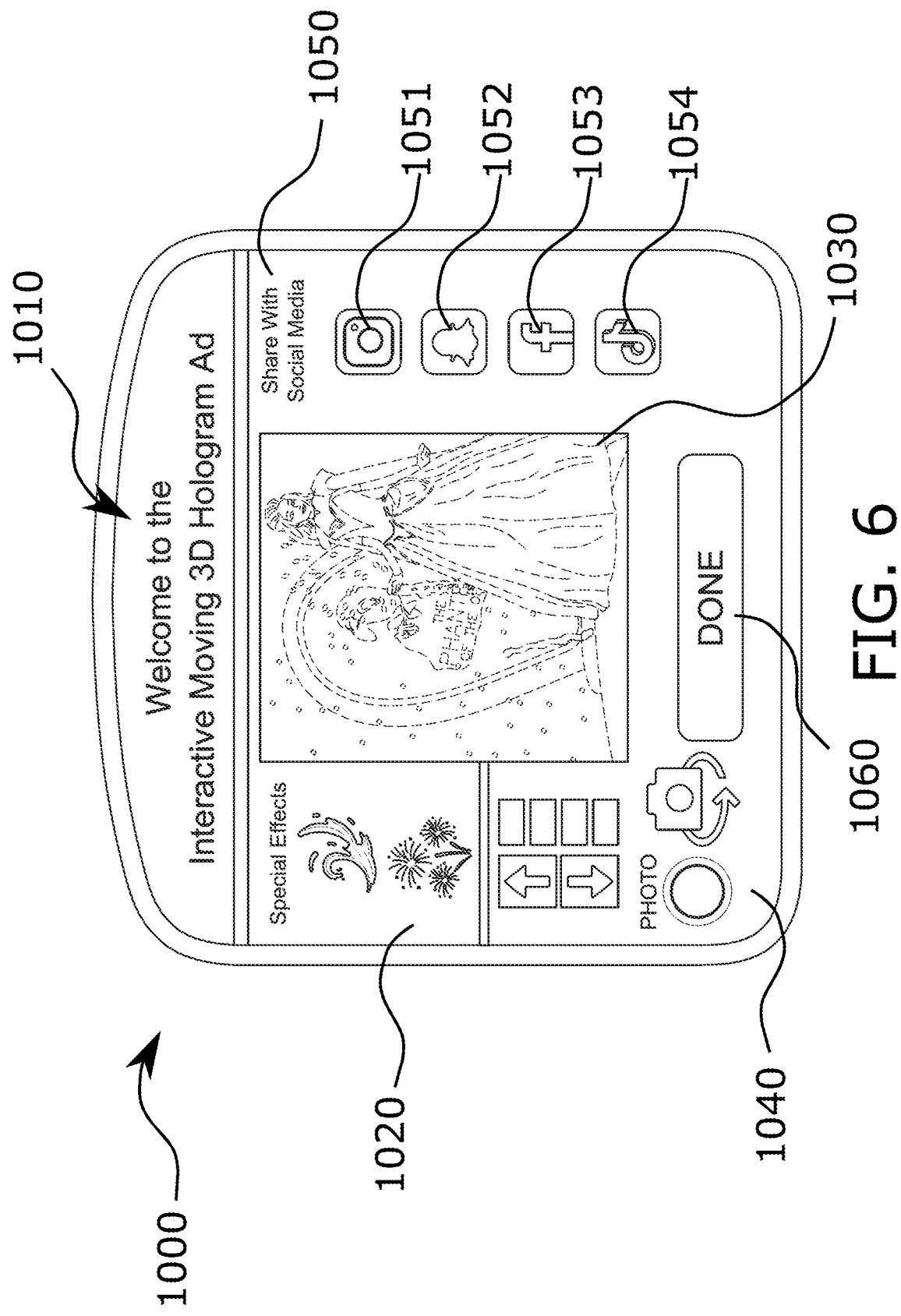
FIG. 6 is a depiction of a user interface for the holographic promoting system.

The rider or passenger could have extensive control over the hologram image 20 ad with a user interface, as shown in FIG. 6. Some versions of the customization software allow a user to upload their unique rendition of the hologram ad to social media so that they can share their creation with their friends or followers. Many different social media formats can facilitate the user sharing their creation. These formats or platforms include INSTAGRAM, SnapChat, Facebook, TIK-TOK, or similar social media platforms that exist now or are created later.

FIG. 6 shows a depiction of an interface 1000 used to customize holographic 3D ads. It includes title 1010; special effects palette 1020; preview region 1030, to allow previewing the creation; photo palette 1040; and share palette 1050. Finally, there is save or share button 1060. As can be seen in the figure, share palette 1050 shows INSTAGRAM button 1051, SnapChat button 1052, Facebook button 1053, and TIK-TOK button 1054. Of course, any other platforms could also contain corresponding buttons in share palette 1050. In some versions, preview region 1030 also connects to a camera outside of the car so that the passenger can see a real or real time view of their creation.

All of these customizations can be recorded from a portable camera that is weather resistant, such as GOPRO or GOPRO-type camera 190. For instance, in some versions, the camera will record the special effects and other customizations created by the passenger.

Interface 1000 can also be used to entertain the passenger. For instance, the screen could be used to watch videos or play video games. The unit could also be used to charge for the ride, for playing the video or video games, or for any other provided service. The unit can use typical payment methods including payment methods employing facial recognition or other biometric information.

In some circumstances, the 3D hologram ad may distract the driver. This distraction can be alleviated or rectified in a variety of ways. In some versions, the driver wears special glasses that filter out or block the hologram. Alternatively, an optical coating or electronic device that filters the hologram or dims it could be placed on the windshield.

These methodologies can be implemented for the drivers of other vehicles, as well. That is, whether the hologram projector is on the driver's vehicle or another vehicle, various versions exist that allow drivers to filter out any potential distraction from the hologram.

The user can modify the ad by adding special effects like splashing water or fireworks. Or the user can take a selfie with the ad or insert some other photo into the ad. As desired, the owner of the ad or product can limit the types of customizations available for the user in order to prevent the user from inadvertently changing the message to something not desired by the owner or to prevent other shenanigans.

When vehicle is a riverboat 1501 or river ferry 1501 (see FIG. 13 or see FIG. 14), the various versions could include one or more of projector 144. One option would have multiple 22" or 30" fans (model M or L from Hpyervsn) on the top, projecting advertisements. In some versions, the number of display units is limited by the length of the riverboat 1501, with some versions filling the length with holographic projector devices and with other and in other versions partially filling the space with hologram projector devices. Alternatively, or in conjunction with that, multiple projectors 144 could be installed along the side of the riverboat 1501. In some versions to satisfy aesthetic values, the length and height will look proportional to the length and height of the riverboat 1501. Some versions have a 30" fan with four blades and some versions have a 35.5" fan with six blades. Fans of this size are suitable for use on a taxi.

Another option would be to have the wall 2050 concept in the center on the top of a riverboat 1501 and boxed out with a glass. For example, twenty-eight fans on the wall 2050 on each side of the boat would be enough to form a large hologram 20. Such an arrangement would allow projecting a 4 k image on each side so that the image is viewable on both sides of the river. Another option would be to have one large LED fan in the center of the top of the riverboat connected to a pole. In some versions, the holographic image will be much larger and look proportional to the length of the riverboat, and the image will be under a glass cover possibly a pyramidal one. In some versions, a display wall has four projectors 144 yielding a three-foot image size. In other versions, the display wall has twenty-eight projectors 144.

For private shuttles, such as a tram car 1510 or other parking shuttles (think Disneyland or Disney World) hologram projector system 100 mounts to the top of the shuttle or onto the side of the shuttle.

In some versions, holographic projector systems 100 are also paired with conventional display technology such as display-screen 2010. For instance, an advertising installation could have both flat video screens and holographic projectors operating simultaneously, with the content and ads joins to create a unified effect between the two different displays or the displays generate or display ad content independently of the other display.

In some versions, a transparent plastic or glass component covers the fan, this helps the holographic image to sustain its resolution. The cover can have any desired shape, such as circular or pyramidal. Without a protective cover, dust particle, wind, and water will sometimes obscure or negatively affect image quality. Additionally, the environment can damage the projector. Likewise, the projected image, the hologram, can be circular or some other shape. In some versions, a black background is less visible at night. Many known transparent plastics are useful for fan covers including those that are acrylic or that are made from PLEXIGLAS™.

Since a bumpy road can affect the 3D hologram fan resolution, some versions of projector are used with vehicles having a sensor system that can even out the road. In some cases, the system can even out the deride over rough pavement enough to prevent the rough pavement from substantially distorting the holographic image above vehicle. In some cases, the system can detect potholes, react to them to prevent distortion of the holographic image, and report the location of the pothole to local road authorities and other vehicles.

Figure 7:
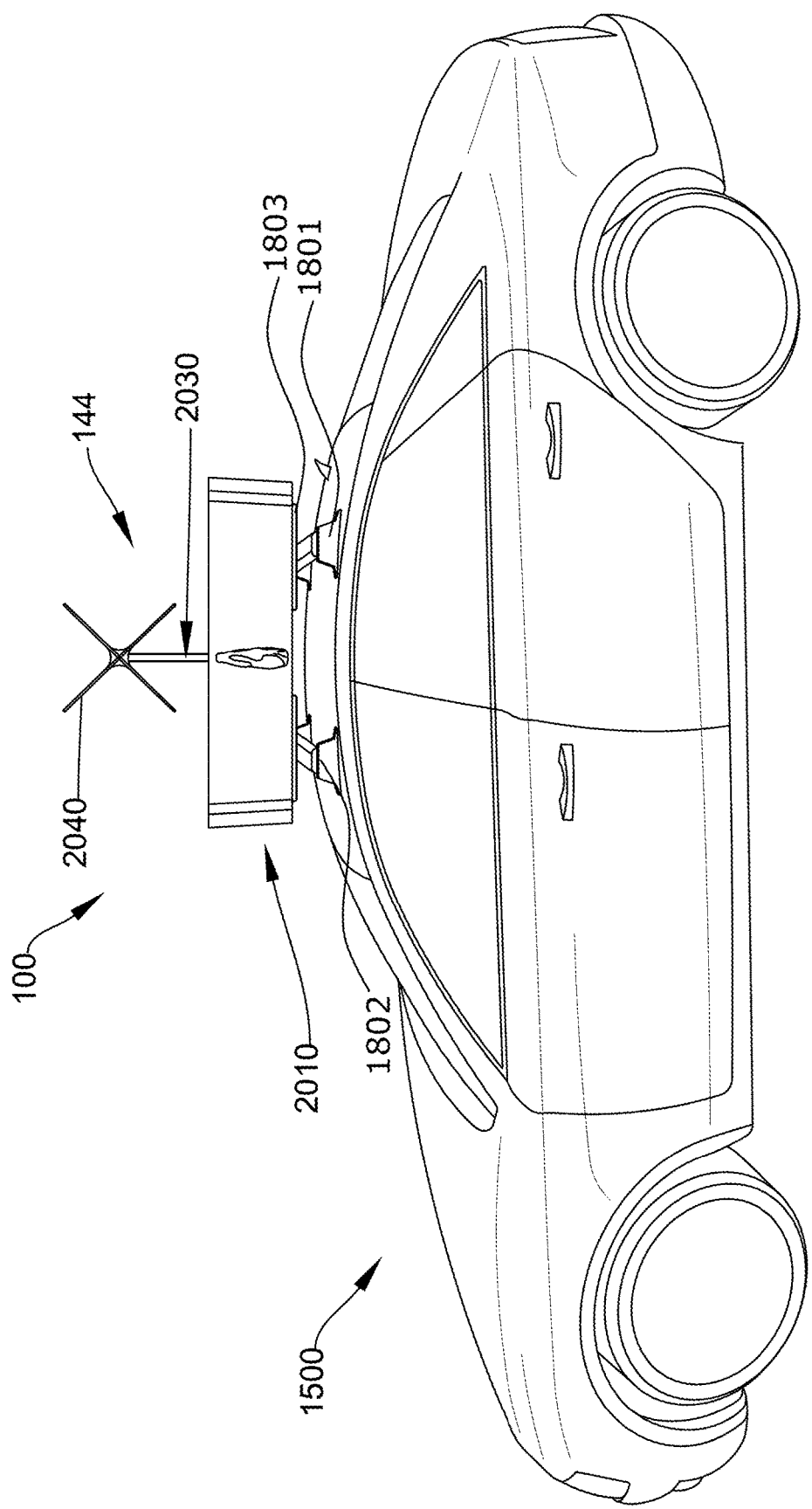
FIG. 7 is a side perspective view of a holographic promoting system mounted on an automobile.
Figure 9:
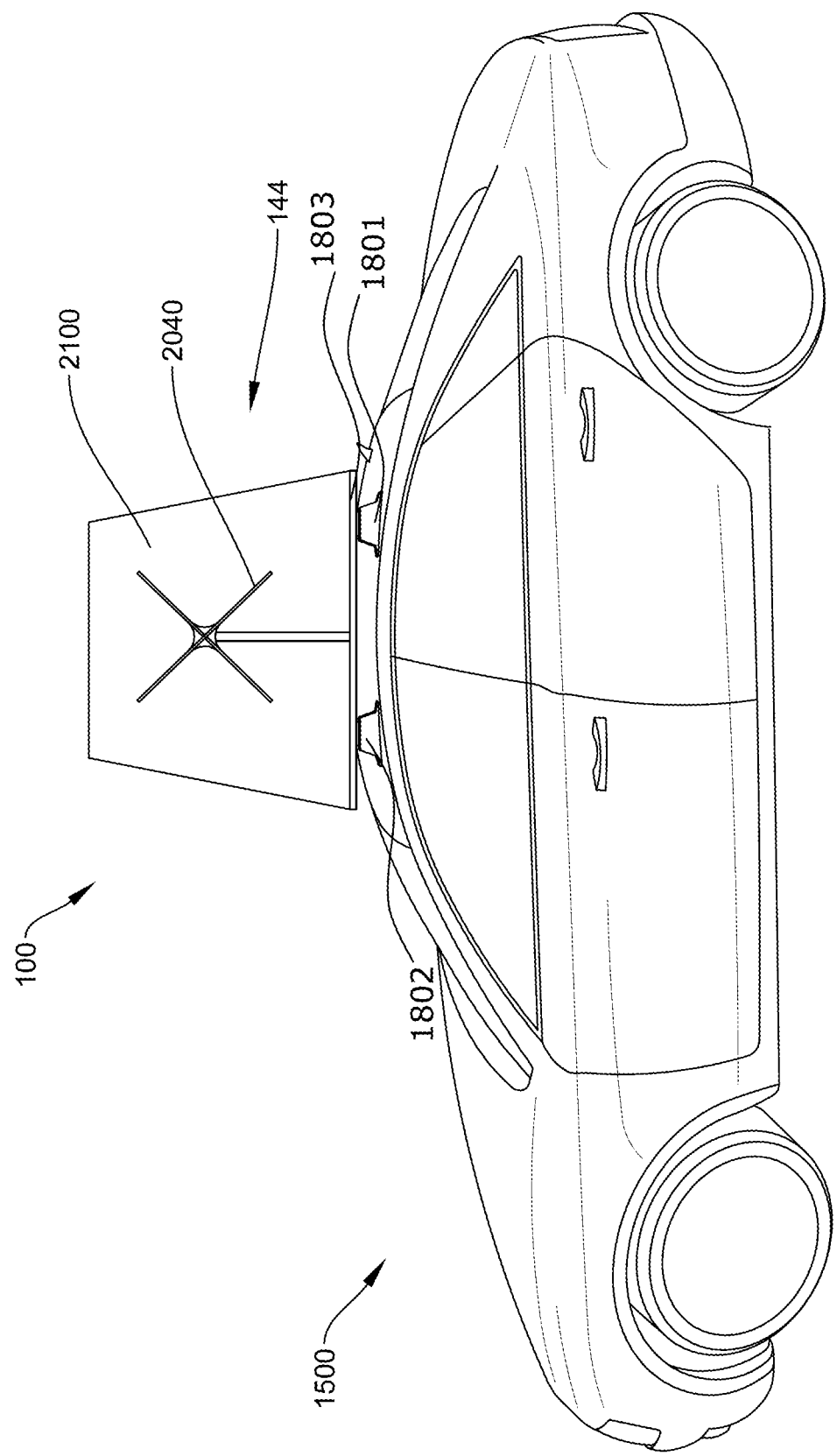
FIG. 9 is a side perspective view of a holographic promoting system mounted on an automobile.
Figure 10:
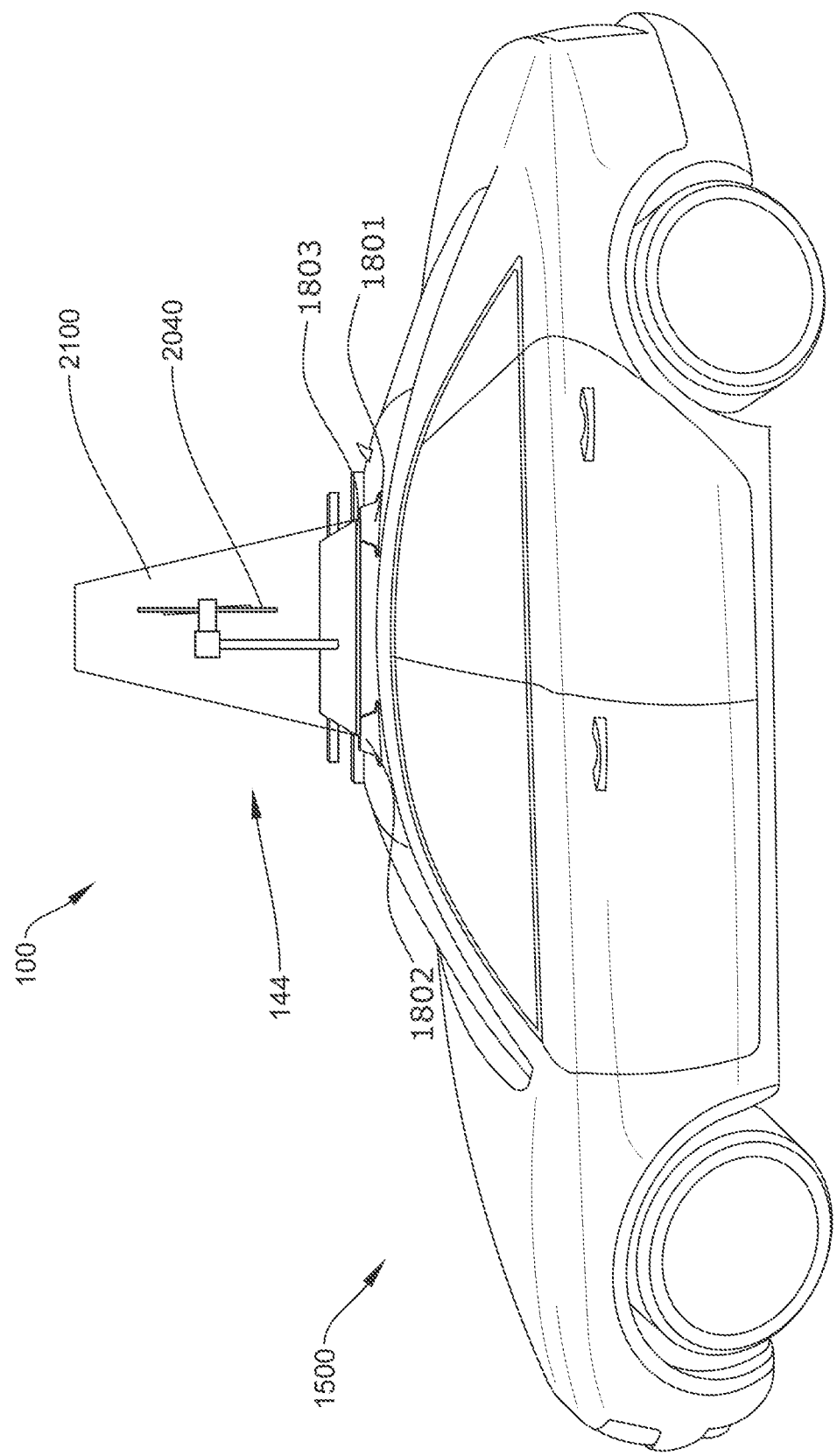
FIG. 10 is a side perspective view of a holographic promoting system mounted on an automobile.
Figure 11:
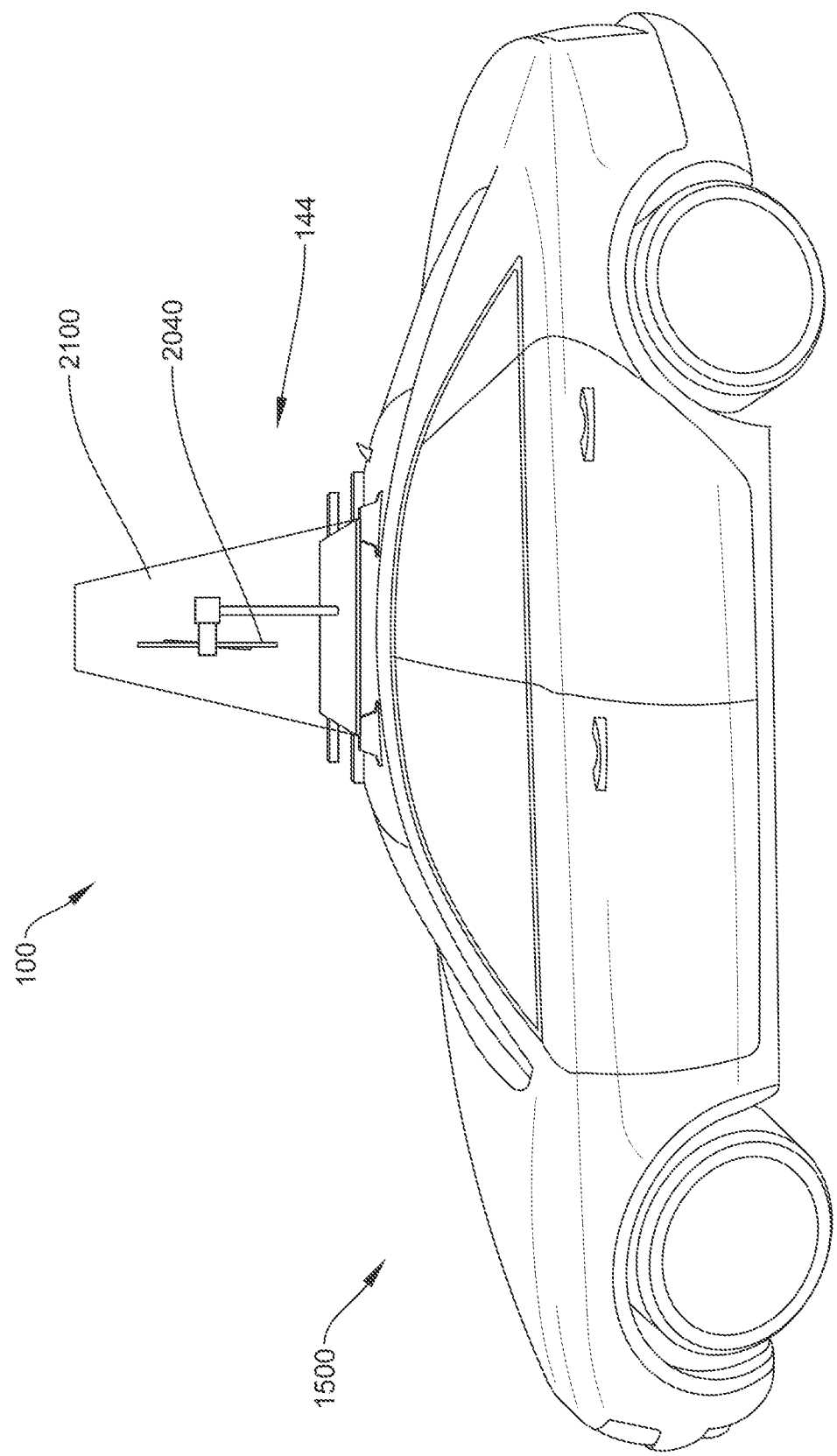
FIG. 11 is a side perspective view of a holographic promoting system mounted on an automobile.

FIG. 7 shows holographic advertising system 100 as mounted on a vehicle, such as automobile 1500. Generally, system 100 mounts on any movable object or vehicle 1500. Versions exist that have both display-screen 2010 and projector 144 mounted separately or mounted together on pole 2030 with a mounting bracket (not shown). Fan 2040 mounts at the end of pole 2030, in this version. FIG. 7 shows projector 144 mounted to the top of the vehicle with a removable mounting device that connects to the vehicle similar to the way an automobile roof luggage carrier connects to the roof of an automobile. Bracket 1801 and bracket 1802 connect system 100 to a vehicle, such as automobile 1500. Pole 2030 extends upward from platform 1803 and mounts projector 144 including fan 2040 to platform 1803 elevated from platform 1803. Brackets 1801, 1802 extend from one side of the vehicle to the other across the roof, in some versions. Sometimes the holographic ad projector 144 has no cover. This arrangement is suitable for environments without inclement weather or for waterproof or dustproof projector versions. Other versions have covers to environmentally protect projector 144. Strong wind could affect a hologram image resolution of an object in motion. FIG. 7 depicts projector 144 pointing to the side of the vehicle. But other versions exist in which projector 144 points in any useful angle. For instance, FIG. 9 shows projector 144 pointing to the side of automobile 1500. And FIG. 10 shows projector 144 pointing to the back of automobile 1500. And FIG. 11 shows projector 144 pointing to the front of automobile 1500.

Figure 8:
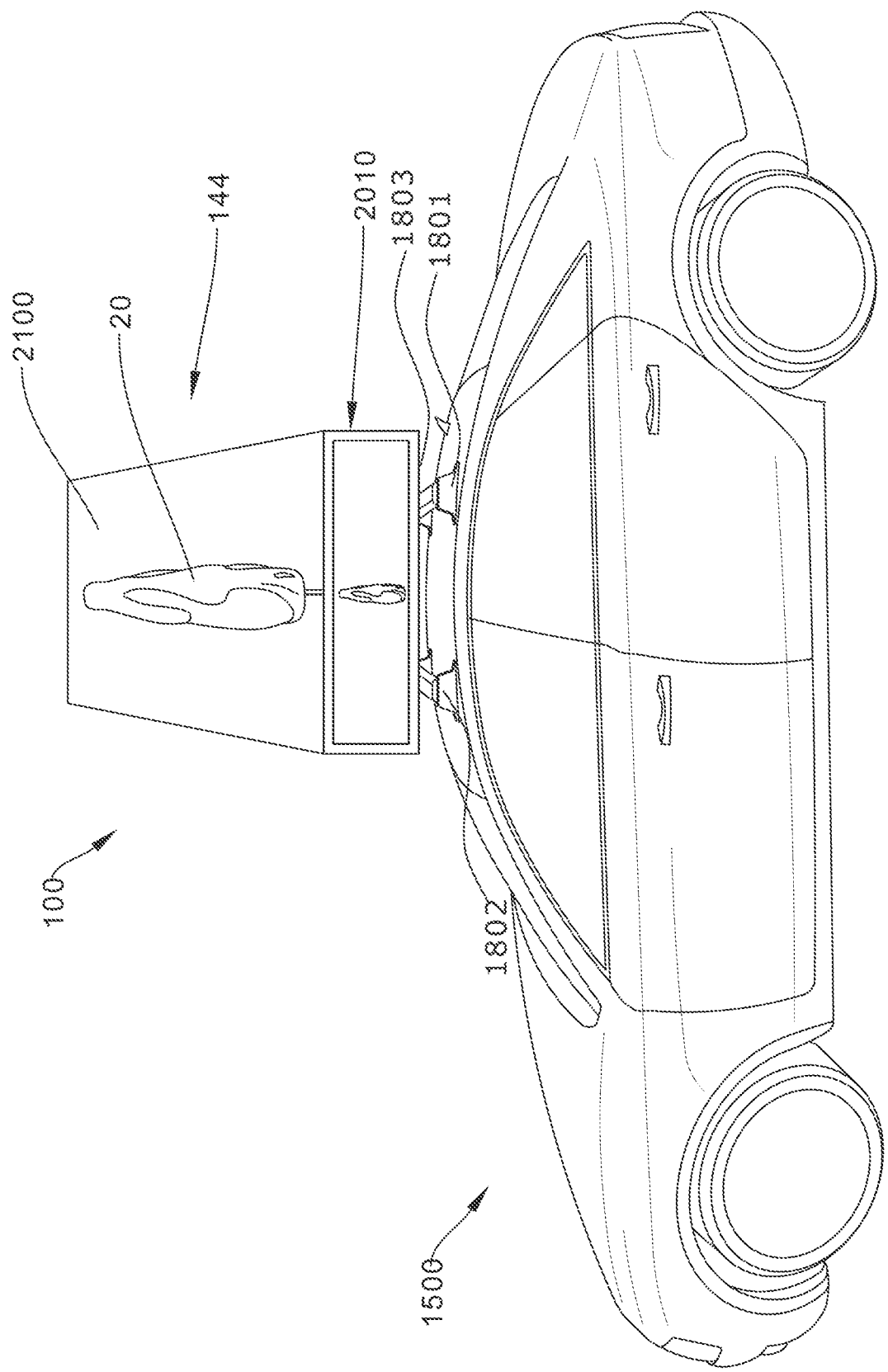
FIG. 8 is a side perspective view of a holographic promoting system mounted on an automobile.

FIG. 8 shows holographic advertising system 100 as mounted on vehicle 1500. Generally, system 100 can be mounted on any movable object or vehicle 1500. This version has both the display-screen 2010 and projector 144. In this case, projector 144 uses cover 2100, which is transparent, made from glass or plastic such as acrylic or Plexiglas. The figure shows hologram 20, which depicts a beverage bottle.

FIG. 9 shows a holographic advertising system 100 as mounted, on vehicle 1500. Generally, system 100 can be mounted on a movable object or on vehicle 1500. In this version, cover 2100 sits completely over system 100. Fan 2040 is shown stationary underneath cover 2100. In some versions, hologram image 20 reflects off of fan 2040 on one side (thus extending from one side of vehicle 1500); in some versions, hologram images 20 reflect off of both sides of fan 2040 (thus extending from two sides of vehicle 1500). Depending upon the arrangement of LEDs or micro-LEDs, hologram image 20 displayed on one side of fan 2040 can be the same as or different from the hologram displayed on the other side of fan 2040. In some versions, strips of LEDs along fan blades 2041 of fan 2040 generate the hologram image 20 on one side (thus extending from one side of vehicle 1500); in some versions, strips of LEDs along fan blades 2041 of fan 2040 generate the hologram image 20 on both sides of fan 2040 (thus extending from two sides of vehicle 1500).

Figure 12:
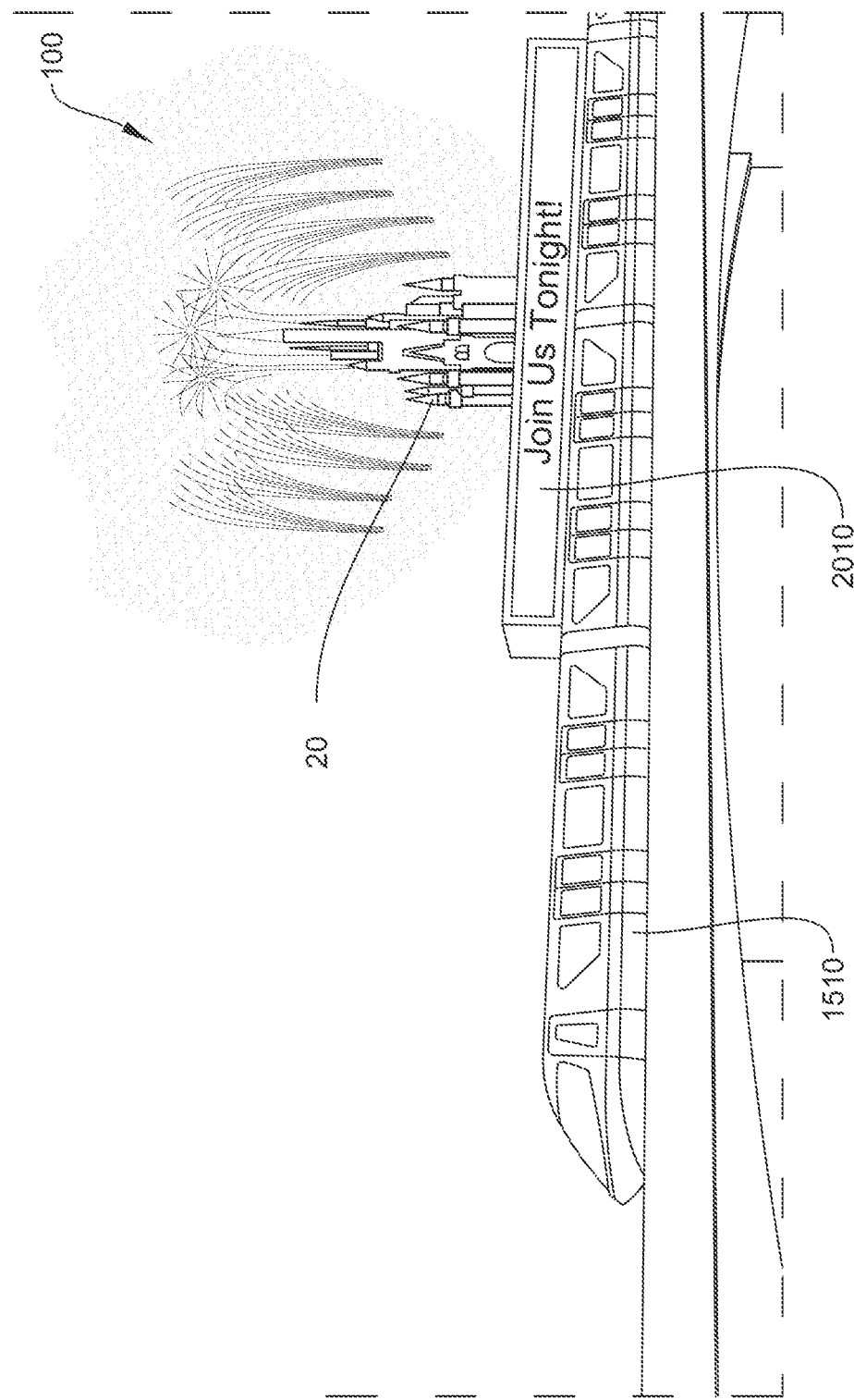
FIG. 12 is a side perspective view of a holographic promoting system mounted on a tram car.

FIG. 12 shows system 100 mounted on tram car 1510. In this configuration, an advertiser can advertise on display-screen 2010 with a message connected with the advertisement on hologram 20. For instance, DISNEY could have the message JOIN US TONIGHT on the display-screen 2010 and, above that, a hologram 20 advertising fireworks. Similarly, the advertisement on display-screen 2010 can be unconnected with the advertisement on hologram 20.

Figure 13:
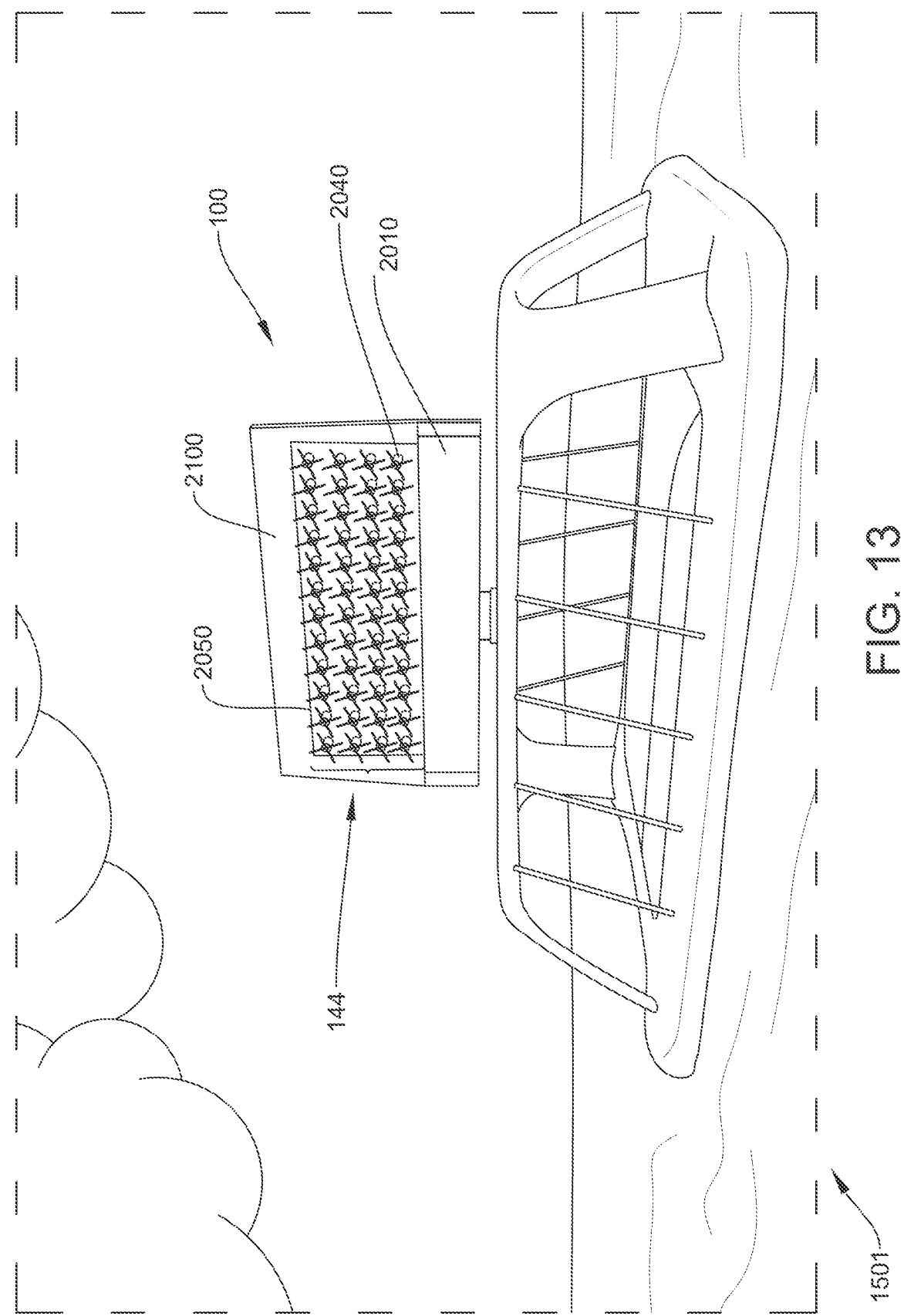
FIG. 13 is a side perspective view of a holographic promoting system mounted on a riverboat.
Figure 14:
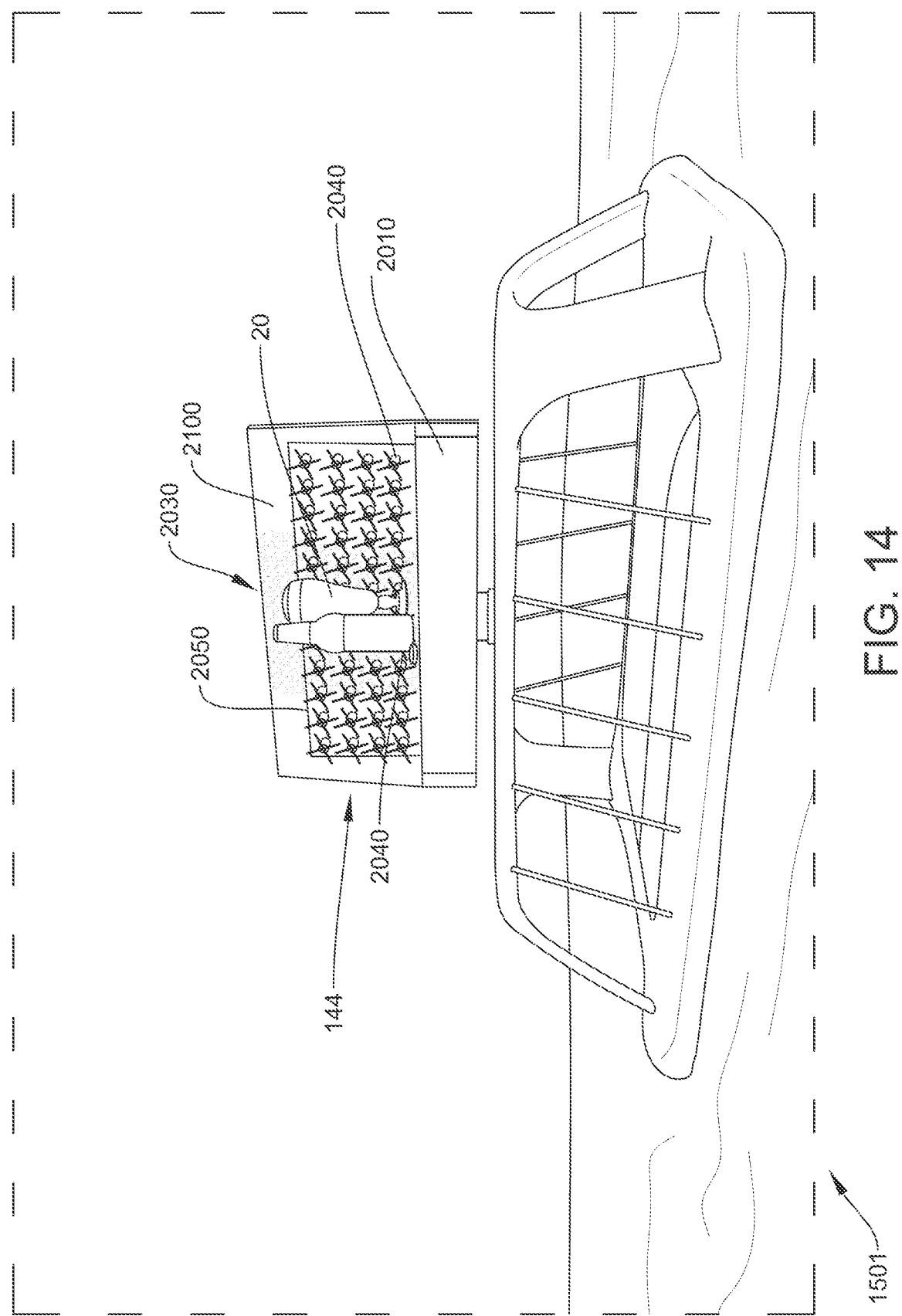
FIG. 14 is a side perspective view of a holographic promoting system mounted on a riverboat.

FIG. 13 shows a boat, such as a river ferry or riverboat 1501. System 100 lends itself to at least three different options on riverboat 1501. One option has multiple 22" or 30" fans 2040 (model M or L from Hpyervsn, for example) on top of the riverboat 1501, projecting ads. A standard-sized riverboat could use any number of projectors 144 depending on the desired size of the display-screen 2010, projectors 144. Another option would place an arrangement of multiple fans 2040 that yields a wall 2050 of projector space in or on the top or center of riverboat 1501. This projection wall could be boxed out with a transparent cover 2100. A specific wall of projector space could use 28 fans on each side of the wall. In some versions, such a wall of projection space would suit projecting a 4K image on each wall side viewable from both sides of the river. A third option would have one large fan 2040 all in the center of the top of the riverboat connected to a pole. In this version, fan 2040 would be large enough to provide a display surface proportional to the length and height of the riverboat 1501. In some versions, projector 144 displays the image on cover 2100. In some versions, cover 2100 have a pyramidal shape. The version shown in FIG. 13 shows projectors 144 without a displayed hologram. The version shown in FIG. 14 shows projectors 144 with a displayed hologram 20. Some versions have a clear pyramid cover over a projector or fan wall (designed to increase the size of the display). This cover protects the wall from harsh elements, such as rain, dust, and wind. In these or other versions, the fan wall connects to a rotating wheel on the boat. As a user raises the projector displaying the ad image, that wheel rotates toward the bow. Once in that position, wall 2050, fans 2040, or projectors 144 can pivot up slightly to project the ad image upward, depending on which version the vehicle uses.

Figure 15:
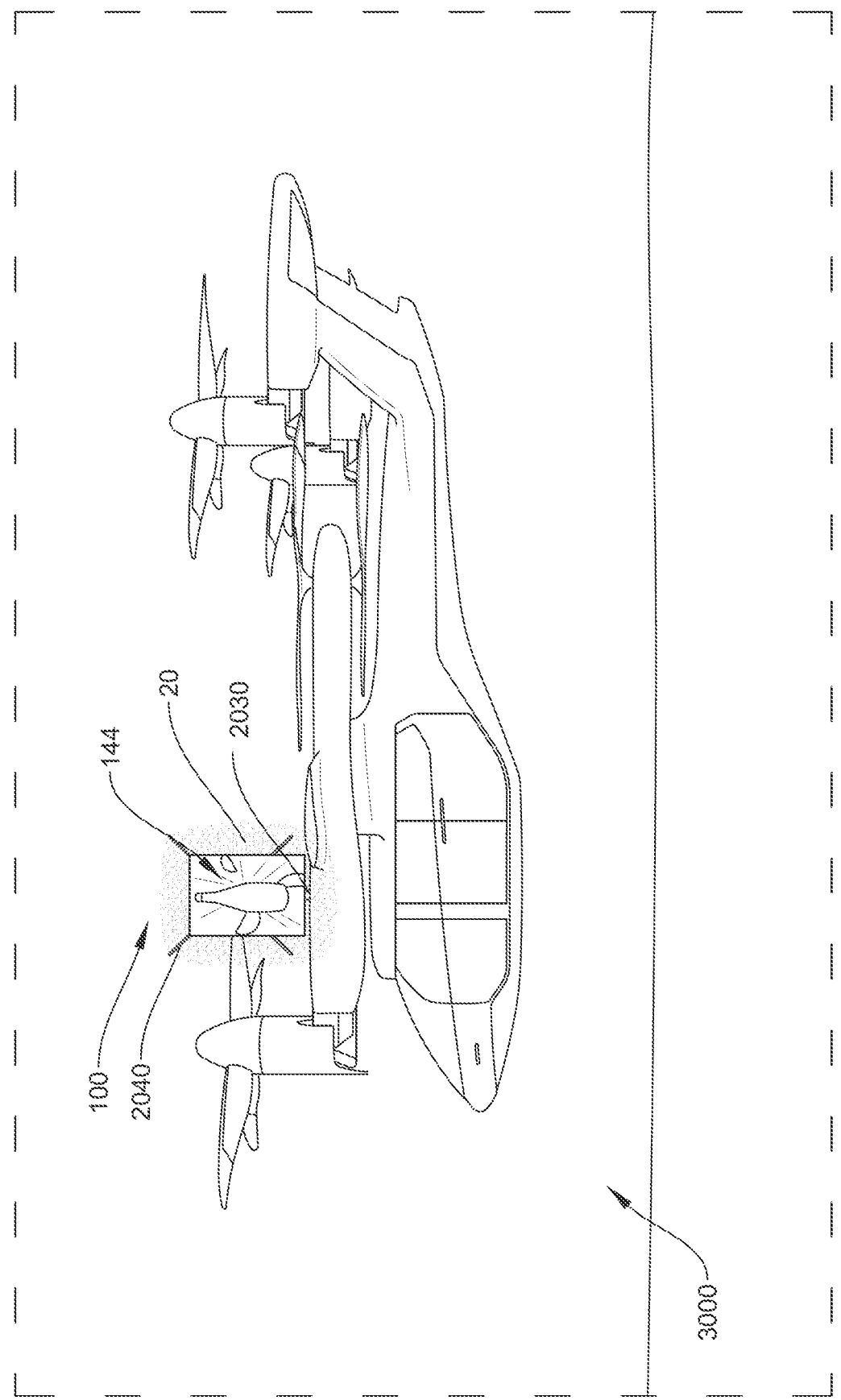
FIG. 15 is a side perspective view of a holographic promoting system mounted on an air taxi.
Figure 16:
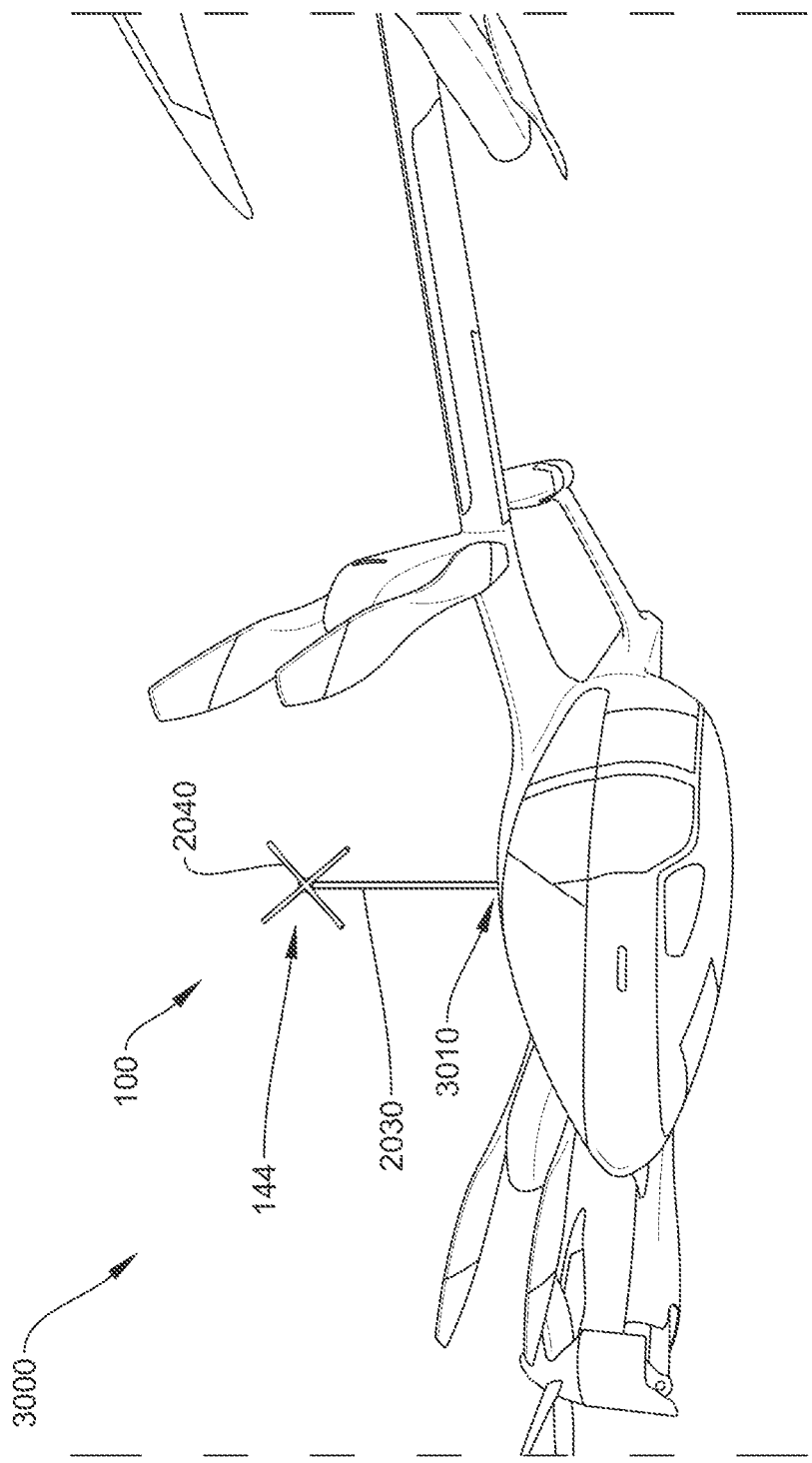
FIG. 16 is a front-left perspective view of a holographic promoting system mounted on an air taxi.
Figure 17:
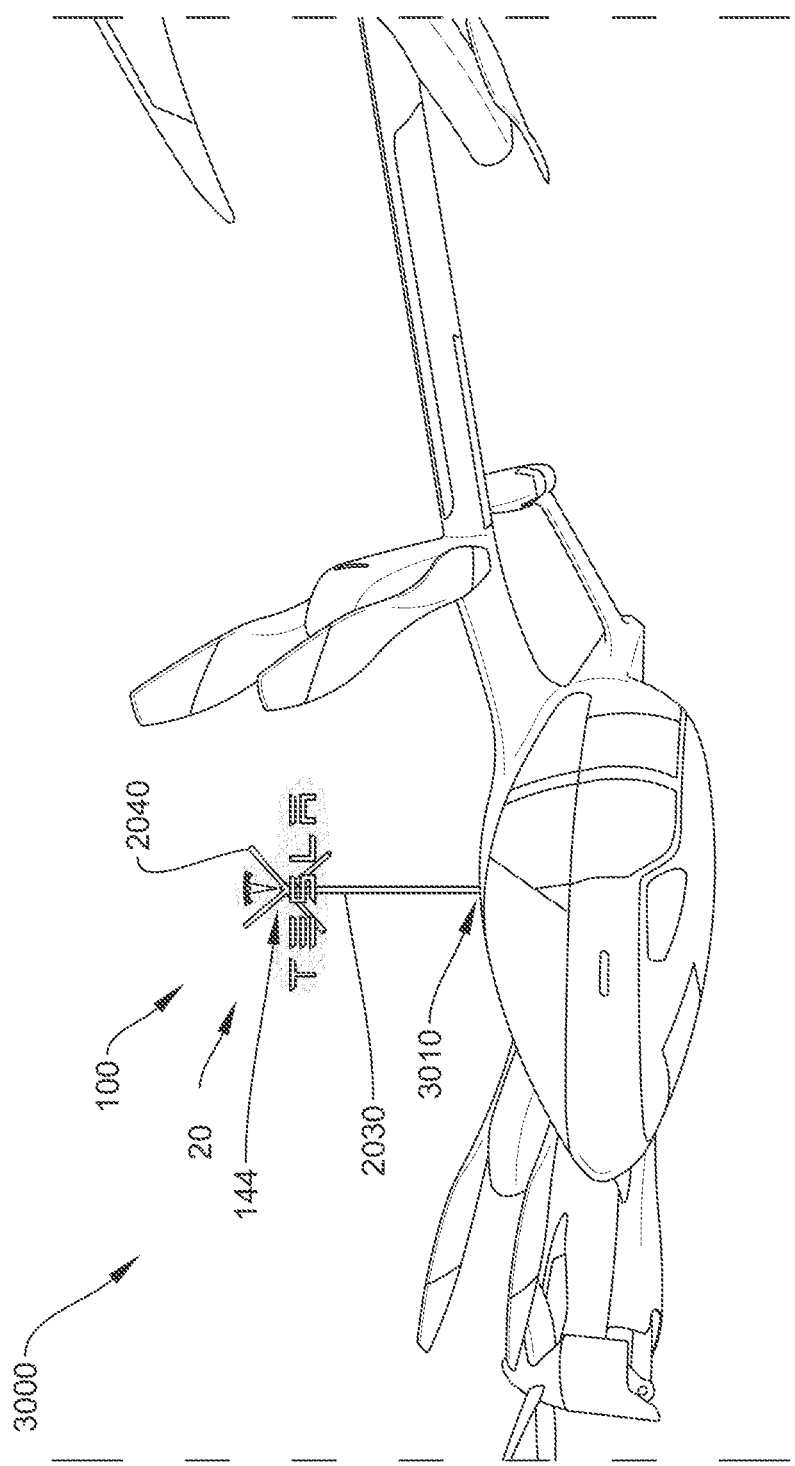
FIG. 17 is a front-left perspective view of a holographic promoting system mounted on an air taxi.

FIG. 15 shows an air taxi 3000 displaying hologram image 20 from projector 144. For these types of taxis, one or more retractable poles 2030 extend out and retract in during takeoff and landing like the action of landing gear. One or more projectors 144, having fans 2040, mount to the retractable poles 2030. In some versions, projector 144 has a dome-shaped cover (not shown) to minimize the forces of wind or air on projector 144 during flight. FIG. 16 shows an air taxi 3000 similar to that of FIG. 15. This depiction is not showing a hologram image. Compartment 3010 is at the base of retractable pole 2030. FIG. 17 shows the air taxi 3000 with the hologram image 20 displayed.

Figure 18:
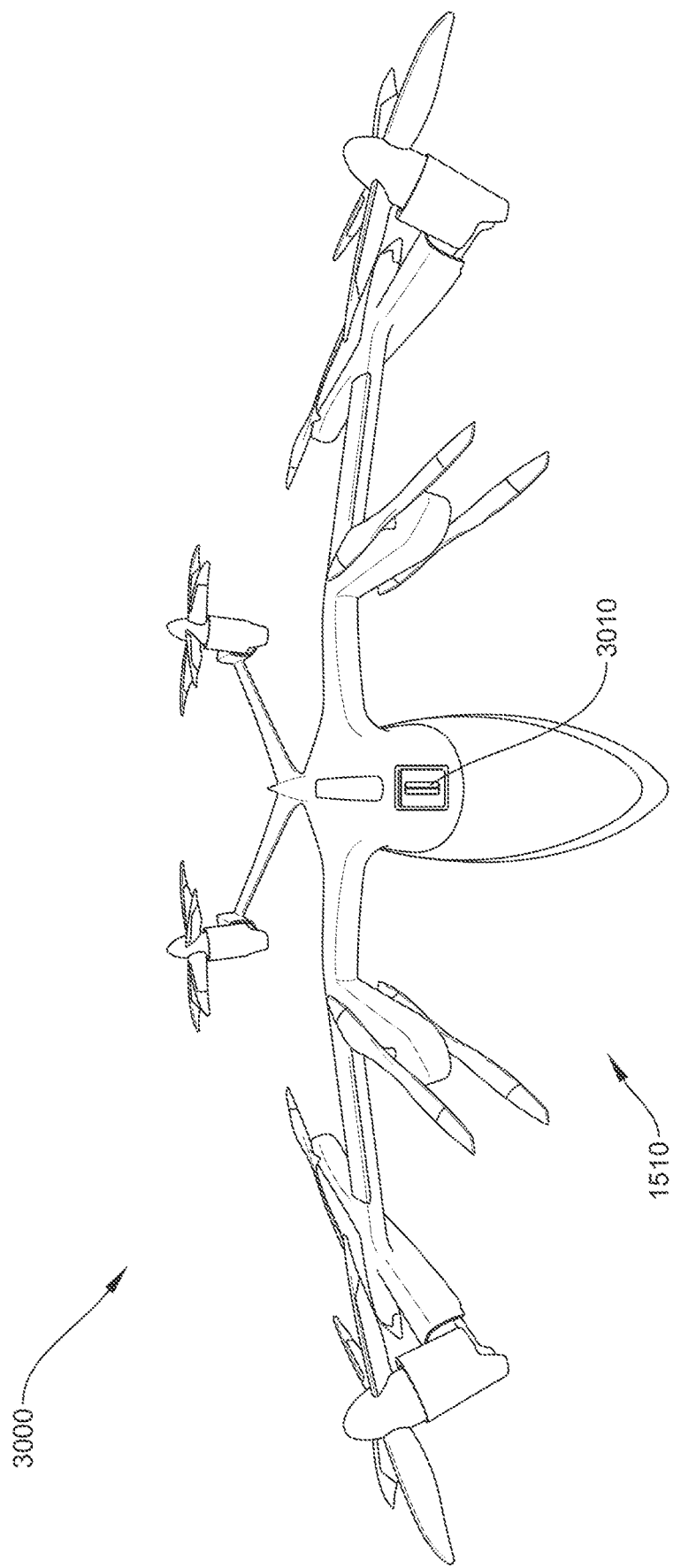
FIG. 18 is a front perspective view of a holographic promoting system mounted on an air taxi.
Figure 19:
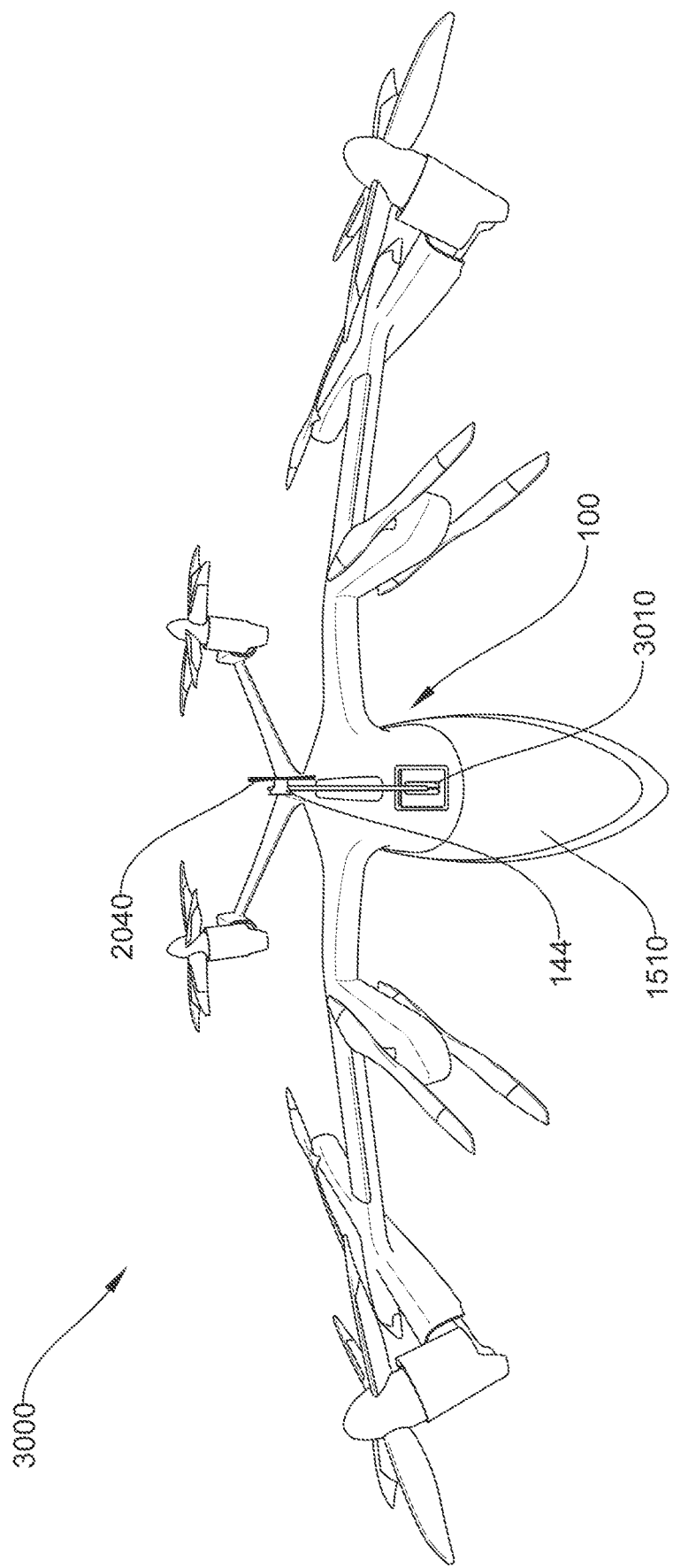
FIG. 19 is a front perspective view of a holographic promoting system mounted on an air taxi.

FIG. 18 shows a different version of air taxi 3000 in which projector 144 and fan 2040 retract into compartment 3010. FIG. 19 shows the configuration of air taxi 3000 depicted in FIG. 18 with projector 144 having fan 2040 extending out from compartment 3010. In some versions, projector 144 automatically extends out from compartment 3010 at the same time as the landing gear extend, either under the pilot's control or not. Similarly, on takeoff, projector 144 can automatically retract into compartment 3010 as the landing gear retracts. Some versions will limit hologram projection to initial takeoff times, final landing times, or those times when the air taxi is grounded or stationary. That means that projector 144 and fan 2040 will retract into compartment 3010 on or just before takeoff. In some versions, projector 144 and fan 2040 will extend out from compartment 3010 just before touchdown.

Figure 20:
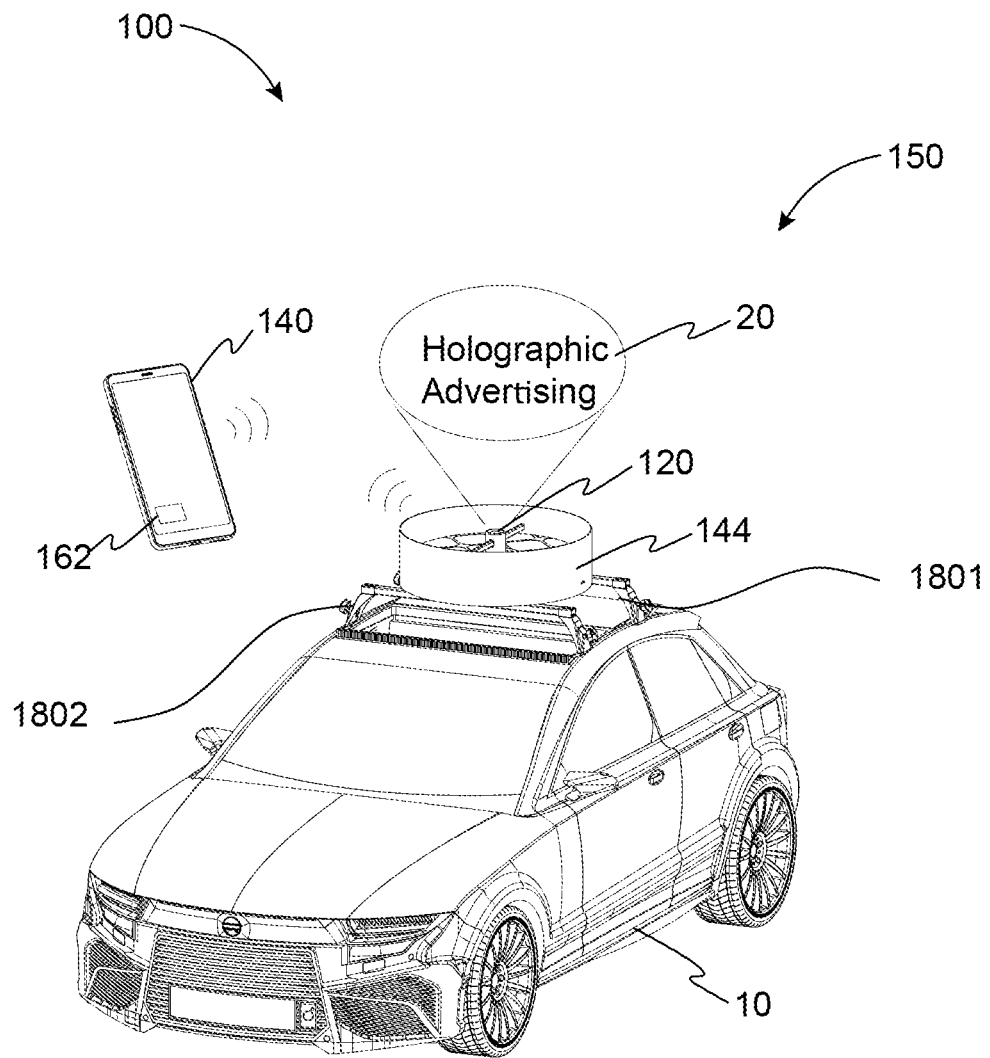
FIG. 20 is a perspective view of the vehicle mountable holographic promoting system during an 'in-use' condition.

FIGS. 20-23 show various views of a vehicle mountable holographic promoting system 100. FIG. 20 shows a vehicle mountable holographic promoting system 100 during an 'in-use' condition 150. As illustrated, system 100 may include projector 144 with light 120, brackets 1801, 1802, and controller 140. Brackets 1801, 1802 connect body 110 to vehicle 10. In some versions, brackets 1801, 1802 removably attach or otherwise secured body 110 to vehicle 10. Controller 140 controls projector 144 to visually promote an item using light 120. Light 120 creates an image, hologram 20, of the item. In some versions, hologram 20 appears to float above vehicle 10.

Figure 21:
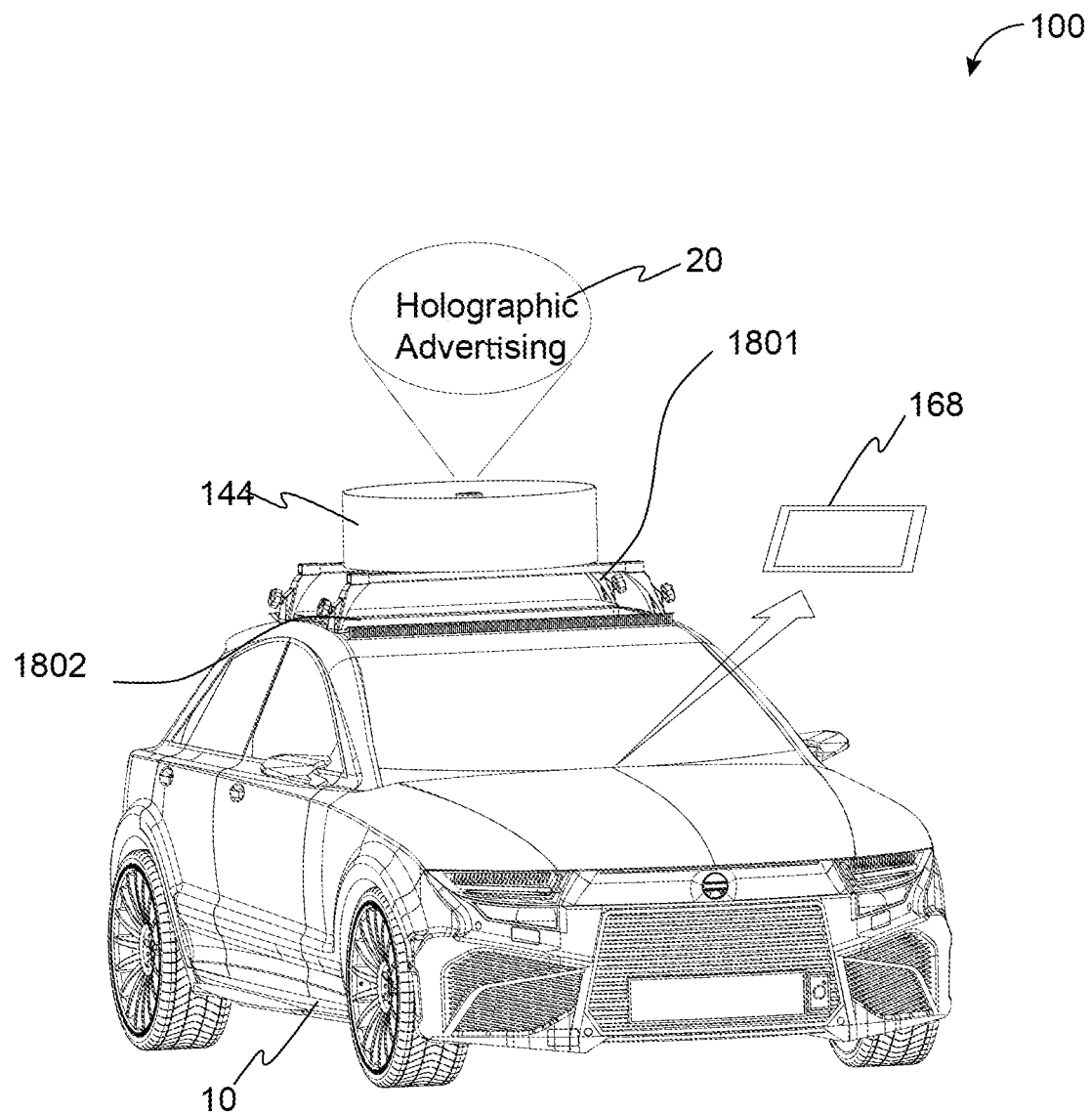
FIG. 21 is another perspective view of the vehicle mountable holographic promoting system of FIG. 1.

FIG. 21 shows a perspective view of vehicle mountable holographic promoting system 100 of FIG. 20. As above, vehicle mountable holographic promoting system 100 may include fan projector 144 with at least one light 120, brackets 1801, 1802, and a fan projector 144. Controller 140 (FIG. 20) can control the rotation speed and direction of fan projector 144. In some versions, controller 140 is a cellular phone or other touchscreen electronic device with WIFI capabilities and comprises a software application 162 able to specifically control scheduling and advertisement content from a pre-filled business list and to specifically control on and off conditions. control scheduling comprises fillable time-slots which may be scheduled with advertisement content. Hologram 20 is displayable and viewable during lighted and non-lighted conditions. In some versions, light 120 is a strip of LEDs.

As shown in FIG. 21, vehicle mountable holographic promoting system 100 further includes a display-screen 168 located on a dashboard of vehicle 10 and communicably coupled with controller 140 (not shown). display-screen 168 displays information regarding the fillable time-slots of each ad and will sync with software application 162 and fan projector 144 simultaneously. A transmitter using Bluetooth (or other near range) technology will sync the ads inserted in different fillable time-slots on software application 162 with fan projector 144 on top of vehicle 10 simultaneously. This way a driver may view the ads displayed on display-screen 168. If WIFI technology is not connecting or otherwise functioning, a waterproof slot is provided on fan projector 144 for receiving a memory card or the like containing data of the ads.

Figure 22:
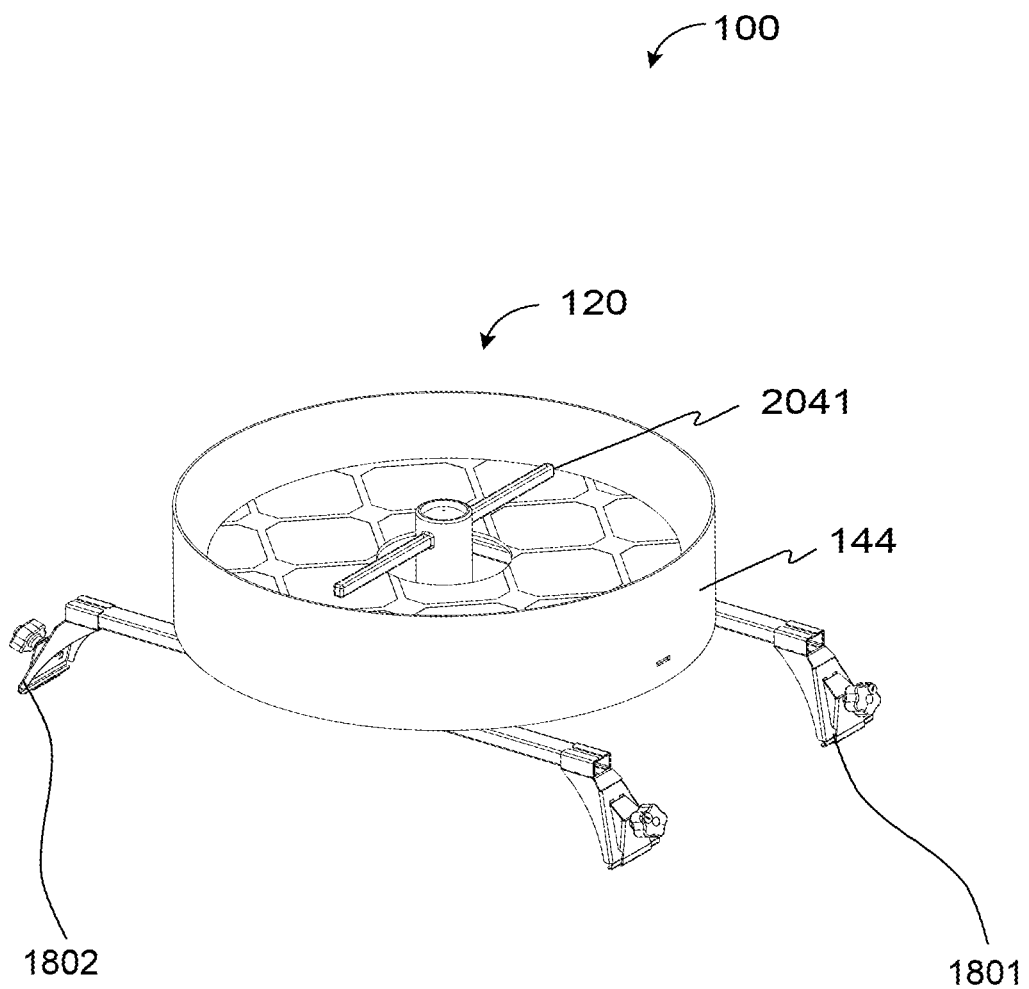
FIG. 22 is a perspective view of the vehicle mountable holographic promoting system of FIG. 20.
Figure 23:
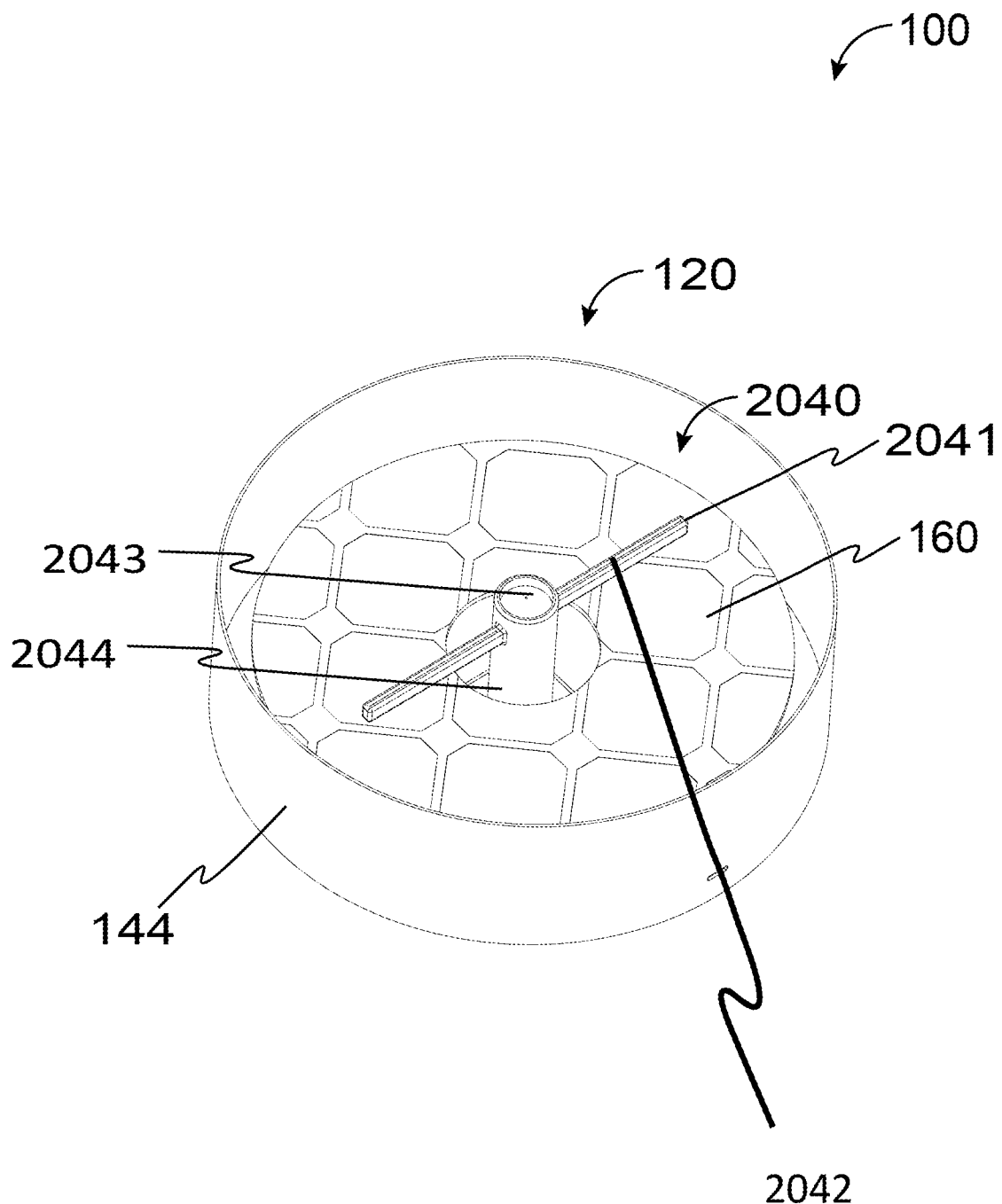
FIG. 23 is a perspective view of components of the vehicle mountable holographic promoting system of FIG. 19.

FIG. 22 shows a perspective view of the vehicle mountable holographic promoting system 100 of FIG. 21. As above, the vehicle mountable holographic promoting system 100 may include fan projector 144 with at least one light 120, brackets 1801, 1802, and fan blades 2041. The controller controls the rotation speed and direction of fan projector 144. In some embodiments, the controller is a cellular phone or other touchscreen electronic device with WIFI capabilities FIG. 23 shows a perspective view of projector 144. As above, projector 144 may include a motor 2044, hub 2043 connecting fan blades 2041 of fan 2040 to motor 2044. Fan blades 2041 have LED strips 2042 along their edges. Projector 144 advertises with a hologram image. Fans 2040 revolve at an appropriate number of revolutions per minute including at least in the range of 670-2000 RPM. FIG. 23 shows solar panel 160.

Holographic projector 144 has two operating modes which are selected on the switch at the LED array base. Setup mode is used for setting up the device. Operating-mode is used for daily operation. Setup mode is used for initial use and when the operator desires to change operating parameters. When setup mode is turned on, the device displays WIFI Hotspot message and creates a private wireless network close to the device. The networks name is detailed in the operating instructions for the holographic projector and indicated on the base of the rotor. In some versions, the name is a seven digit number. The user must locate this private network in order to connect to the device during setup mode. After the user has connected to this private network, the user may download image content or video content to the device. In some versions, the user downloads image content or video content from the user's smart phone.

Operating-mode is the mode used to cause projector 144 to project an image. In this mode, the device can be connected to the internet, be controlled remotely, and display user content. When there is no uploaded user content, the device displays an animated intro.

The steps described in the method of use can be carried out in many different orders according to user preference. The use of "step of" should not be interpreted as "step for", in the claims herein and is not intended to invoke the provisions of 35 USC § 112(f). It should be also noted that, under appropriate circumstances, considering such issues as design preference, user preferences, marketing preferences, cost, structural requirements, available materials, technological advances, etc., other methods for using system 100 (e.g., different step orders within above-mentioned list, elimination or addition of certain steps, including or excluding certain maintenance steps, etc.), are taught herein.

The versions of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the US Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A vehicle-mounted projecting system comprising:
a vehicle
and
a fan projector connected to the vehicle,
wherein
the fan projector comprises a fan, a controller, and lights connected to the fan and controller,
and
the controller comprises electronic communications means to receive image data.

2. The system of claim 1 further comprising a case having an openable compartment mounted in or on the vehicle, wherein
the system has a retracted configuration in which the fan retracts into the case and the compartment is in a closed position,
and
the system has an extended configuration in which the fan extends out from the case and the compartment is in an open position.

3. The system of claim 2 wherein the electronic communications means comprises wired and wireless communications.

4. The system of claim 3 wherein
the controller comprises a processor and memory with software instructions,
and
the processor executes the instructions, facilitating the processor receiving image data and displaying the image data through selective illumination of the lights.

5. The system of claim 4 wherein the image data comprises video data.

6. The system of claim 5 wherein the display resolution is any of 720P, 1080P, High Definition, 4 k, 5 k, 6 k, 7 k, 8 k, 440 px by 440 px, 500 px by 500 px, 512 px by 512 px, 720 px by 720 px, 880 px by 880 px, 1024 px by 1024 px, 1080 px by 1080 px, and 1280 px by 1280 px.

7. The system of claim 6 wherein the fan size is any of 16" (40 cm), 22" (56 cm), 24" (60 cm), 26" 65 cm), 27" (67 cm), 30" (75 cm), 35" (89 cm), and 39" (99 cm) diameters.

8. The system of claim 7 further comprising one or more additional fans.

9. The system of claim 8 wherein the display size is from 2-40 sq. ft.

10. The system of claim 9 wherein a clear cover mounted around the system.

11. The system of claim 10 wherein the vehicle is any of a train, a bus, a helicopter, a car, a taxi, a ferry, a boat, a blimp, an air taxi, or a drone.

12. The system of claim 4 further comprising a display screen connected to the controller using a data interface
and
wherein
the memory comprises additional software instructions,
and
the processor executes the additional instructions, facilitating the processor receiving display-screen image data and displaying the display-screen image data on the screen through the interface.

13. The system of claim 12 wherein the image data comprises video data.

14. The system of claim 13 wherein the display resolution is any of 720P, 1080P, High Definition, 4 k, 5 k, 6 k, 7 k, 8 k, 440 px by 440 px, 500 px by 500 px, 512 px by 512 px, 720 px by 720 px, 880 px by 880 px, 1024 px by 1024 px, 1080 px by 1080 px, and 1280 px by 1280 px.

15. The system of claim 14 wherein the fan size is any of 16" (40 cm), 22" (56 cm), 24" (60 cm), 26" 65 cm), 27" (67 cm), 30" (75 cm), 35" (89 cm), and 39" (99 cm) diameters.

16. The system of claim 15 further comprising one or more additional fans.

17. The system of claim 16 wherein the display size is from 2-40 sq. ft.

18. The system of claim 17 wherein a clear cover mounted around the system.

19. The system of claim 18 wherein the vehicle is any of a train, a bus, a helicopter, a car, a taxi, a ferry, a boat, a blimp, an air taxi, or a drone.

20. The system of claim 19 further comprising a display screen connected to the controller using a data interface.

* * * * *